United States Patent [19]

Reed et al.

[11] 4,259,835
[45] Apr. 7, 1981

[54] SYSTEM AND METHOD FOR MONITORING INDUSTRIAL GAS TURBINE OPERATING PARAMETERS AND FOR PROVIDING GAS TURBINE POWER PLANT CONTROL SYSTEM INPUTS REPRESENTATIVE THEREOF

[75] Inventors: Terry J. Reed, Latrobe; Robert A. Yannone, Aldan, both of Pa.

[73] Assignee: Westinghouse Electric Corp., Pittsburgh, Pa.

[21] Appl. No.: 875,655

[22] Filed: Feb. 6, 1978

Related U.S. Application Data

[63] Continuation of Ser. No. 234,491, Mar. 14, 1972, abandoned.

[51] Int. Cl.³ .............................................. F02C 9/04
[52] U.S. Cl. .............................................. 60/39.28 R
[58] Field of Search .................... 60/39.28 R, 243; 73/4 R, 116; 364/571, 118, 110

[56] References Cited

U.S. PATENT DOCUMENTS

| | | | |
|---|---|---|---|
| 3,515,343 | 6/1970 | Schwartzenberg | 364/571 |
| 3,657,926 | 4/1972 | Munson et al. | 73/4 R |
| 3,764,785 | 10/1973 | Harner et al. | 60/39.28 R |
| 3,795,916 | 3/1974 | Wallace et al. | 364/110 |
| 3,911,347 | 10/1975 | Hartung | 364/118 |
| 3,919,623 | 11/1975 | Reuther | 60/39.28 R |

*Primary Examiner*—Robert E. Garrett
*Attorney, Agent, or Firm*—E. F. Possessky

[57] ABSTRACT

A hybrid digital computer gas turbine power plant control system which may operate in a multiple-control loop arrangement is provided with selected process variable monitoring means. Control system inputs representative of current values of such variables are continuously available to provide positive highly responsive control over a broad range of gas turbine operating conditions. Predictable process sensor errors are effectively eliminated by means of programmed computer operations to thereby insure highly accurate control variable derivation essential to maintaining gas turbine operation at or near design limits.

3 Claims, 41 Drawing Figures

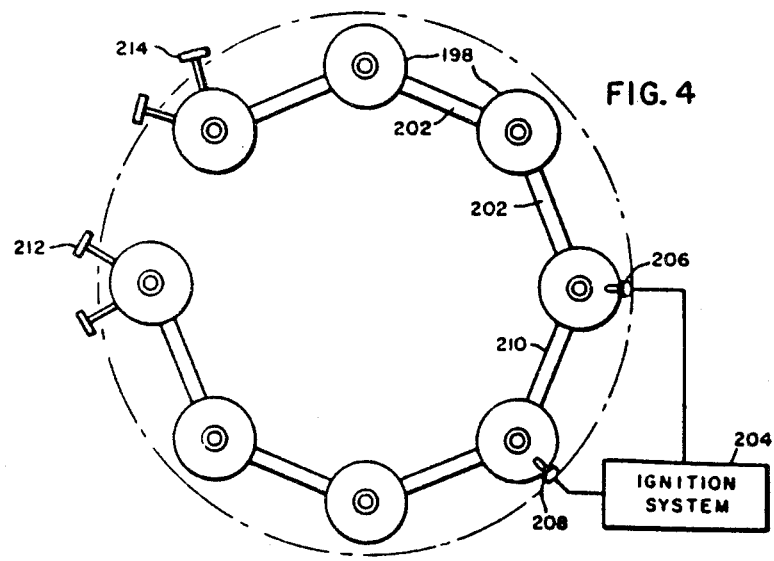
FIG. 4
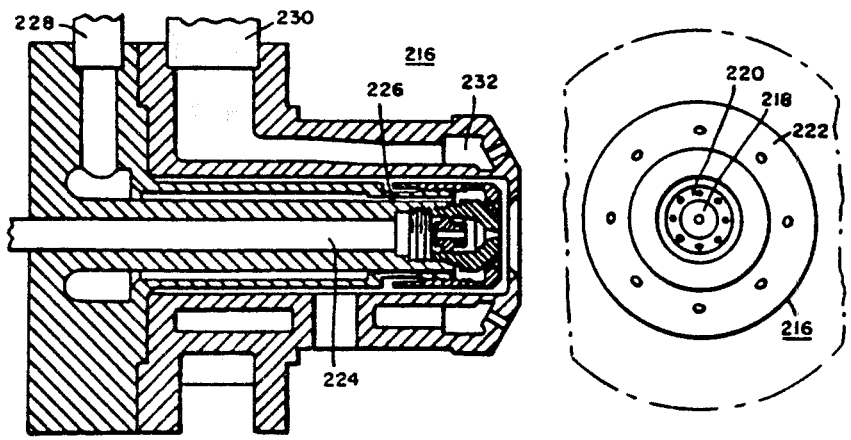
FIG. 6
FIG. 5

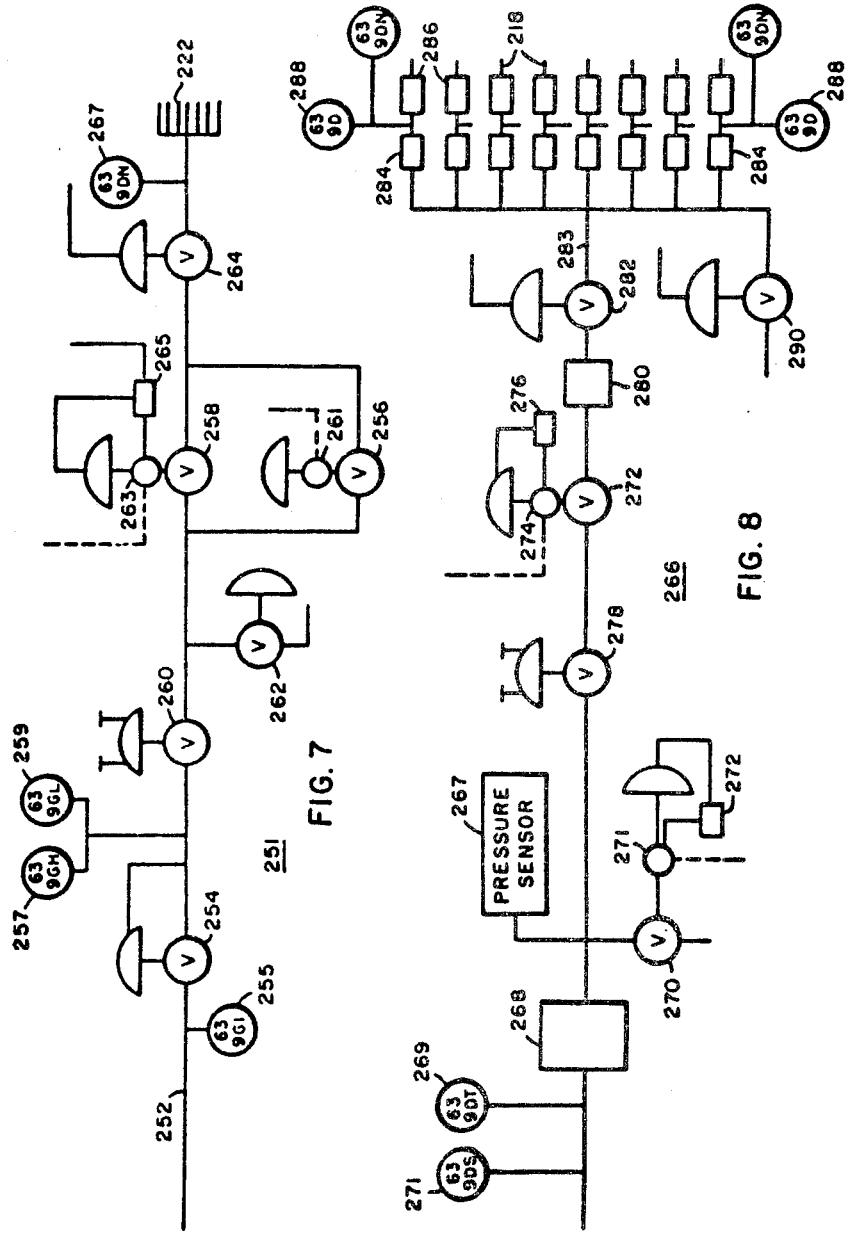

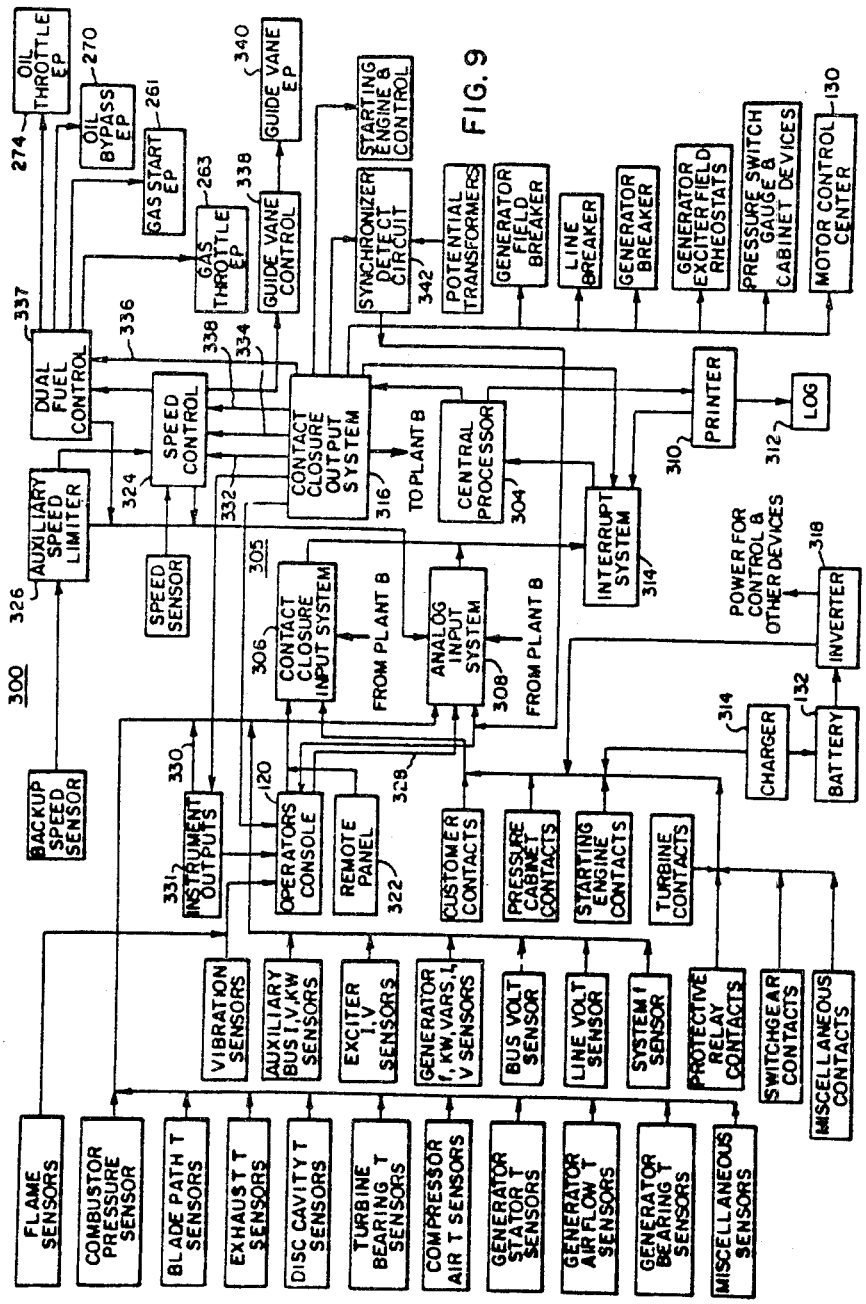

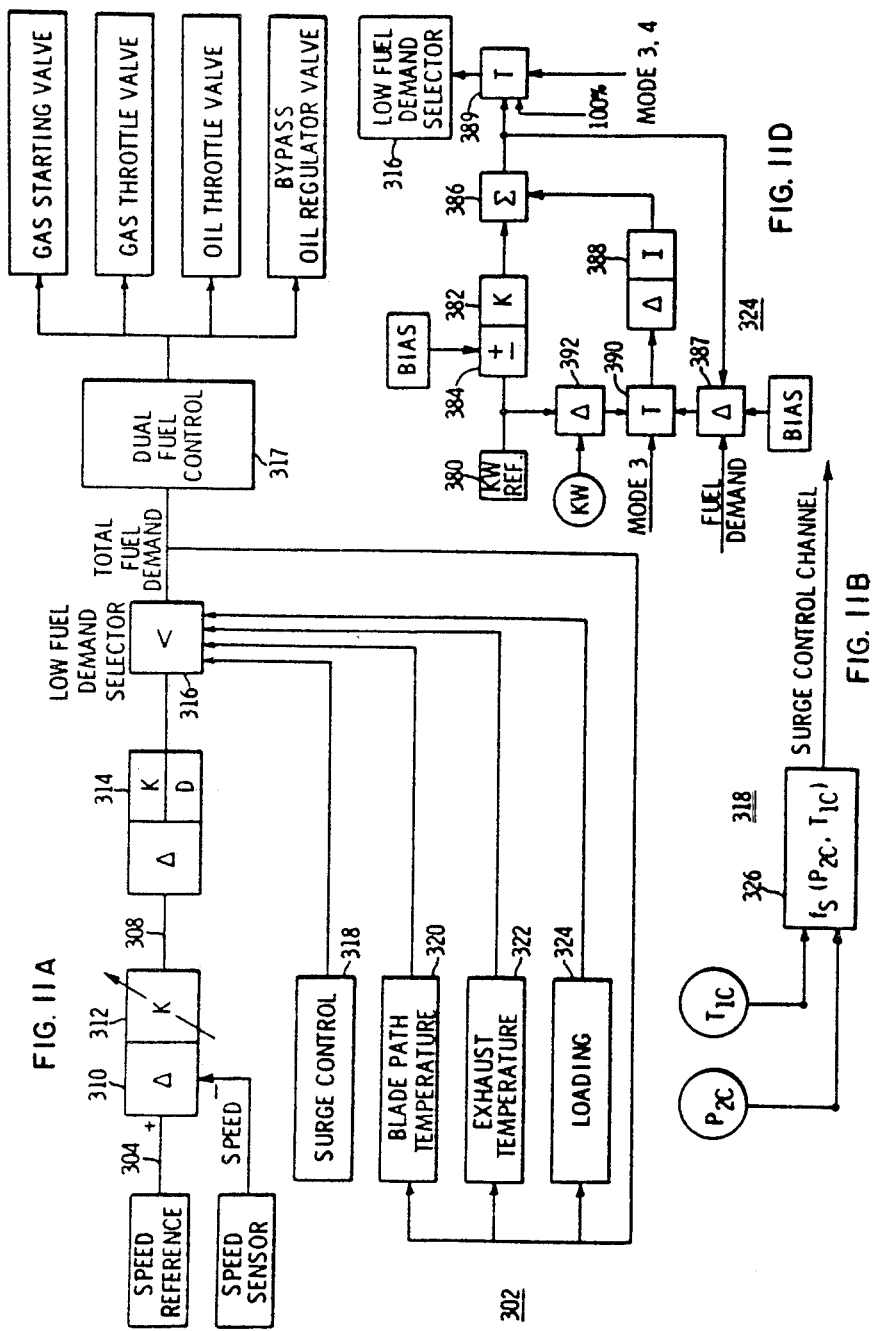

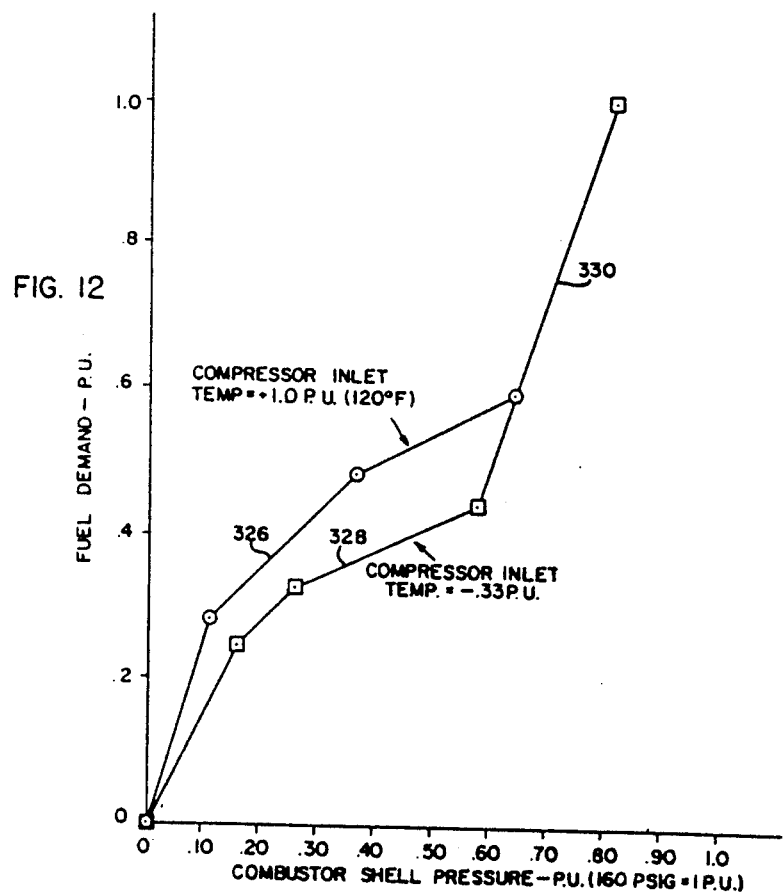

MODE I

SYSTEM AND METHOD FOR MONITORING INDUSTRIAL GAS TURBINE OPERATING PARAMETERS AND FOR PROVIDING GAS TURBINE POWER PLANT CONTROL SYSTEM INPUTS REPRESENTATIVE THEREOF

This is a continuation of application Ser. No. 234,491 filed Mar. 14, 1972 now abandoned.

CROSS-REFERENCES TO RELATED APPLICATIONS

U.S. Ser. No. 082,470, filed Oct. 20, 1970 by J. Reuther and T. Giras, entitled IMPROVED SYSTEM AND METHOD FOR OPERATING INDUSTRIAL GAS TURBINE APPARATUS AND GAS TURBINE ELECTRIC POWER PLANTS PREFERABLY WITH A DIGITAL COMPUTER CONTROL SYSTEM and now continued as Ser. No. 319,114, and assigned to the present assignee.

U.S. Ser. No. 082,469, filed Oct. 20, 1970 by R. Kiscaden and R. Yannone, entitled IMPROVED SYSTEM AND METHOD FOR ACCELERATING AND SEQUENCING INDUSTRIAL GAS TURBINE APPARATUS AND GAS TURBINE ELECTRIC POWER PLANTS PREFERABLY WITH A DIGITAL COMPUTER CONTROL SYSTEM and now divided and continued as U.S. Ser. Nos. 963,635 and 095,174, and assigned to the present assignee.

U.S. Ser. No. 082,467, filed Oct. 20, 1970 by J. Rankin and T. Reed, entitled IMPROVED CONTROL COMPUTER PROGRAMMING METHOD AND IMPROVED SYSTEM AND METHOD FOR OPERATING IND . . . , and assigned to the present assignee.

U.S. Ser. No. 189,633, filed Oct. 15, 1971 by J. Reuther and T. Reed, entitled "Improved Digital Computer Control System And Method For Monitoring And Controlling Operation Of Industrial Gas Turbine Apparatus Employing Expanded Parametric Control Algorithm", and assigned to the present assignee and now issued as U.S. Pat. No. 3,866,109.

U.S. Pat. No. 3,924,140, issued Dec. 2, 1975 by R. Yannone, entitled "Improved System And Method For Monitoring And Controlling Industrial Gas Turbine Power Plants Including A Facility For Dynamic Calibration Of Control Instrumentation", and assigned to the present assignee.

BACKGROUND OF THE INVENTION

The present invention relates to gas or combustion turbine apparatus, gas turbine electric power plants and control systems and operating methods therefor.

Industrial gas turbines may have varied cycle, structural and aerodynamic designs for a wide variety of uses. For example, gas turbines may employ the simple, regenerative, steam injection or combined cycle in driving an electric generator to produce electric power. Further, in these varied uses the gas turbine may have one or more shafts and many other rotor, casing, support, and combustion system structural features which can vary relatively widely among differently designed units. They may be aviation jet engines adapted for industrial service as described, for example, in an ASME paper entitled "The Pratt and Whitney Aircraft Jet Powered 121MW Electrical Peaking Unit" presented at the New York Meeting in November–December, 1964.

Gas turbine electric power plants are usable in base load, mid-range load and peak load power system applications. Combined cycle plants are normally usable for the base or mid-range applications, while the power plant which employs a gas turbine only as a generator drive typically is highly useful for peak load generation because of its relatively low investment cost. Although the heat rate for gas turbines is relatively high in relation to steam turbines, the investment savings for peak load application typically offsets the higher fuel cost factor. Another economic advantage for gas turbines is that power generation capacity can be added in relatively small blocks such as 25MW or 50MW as needed for expected system growth, thereby avoiding excessive capital expenditure and excessive system reserve requirements. Further background on peaking generation can be obtained in articles such as "Peaking Generation", a Special Report of Electric Light and Power dated November, 1966.

Startup availability and low forced outage rates are particularly important for peak load power plant applications of gas turbines. Thus, reliable gas turbine startup and standby operations are particularly important for power system security and reliability.

In the operation of gas turbine apparatus and electric power plants, various kinds of controls have been employed. Relay-pneumatic type systems form a large part of the prior art. More recently, electronic controls of the analog type have been employed as perhaps represented by U.S. Pat. No. 3,520,133 entitled "Gas Turbine Control System" and issued on July 14, 1970 to A. Loft, or by the control referred to in an article entitled "Speedtronic Control, Protection and Sequential System", and designated as GER-2461 in the General Electric Gas Turbine Reference Library. A wide variety of controls have been employed for aviation jet engines including electronic and computer controls as described, for example, in a March, 1968 ASME Paper presented by J. E. Bayati and R. M. Frazzini, and entitled "Digatec" (Digital Gas Turbine Engine Control), an April, 1967 paper in the Journal of the Royal Aeronautical Society authored by E. S. Eccles and entitled "The Use Of A Digital Computer For On-Line Control Of A Jet Engine", or a July, 1965 paper entitled "The Electronic Control Of Gas Turbine Engines" by A. Sadler, S. Tweedy and P. J. Colburn in the July, 1965 Journal of the Royal Aeronautical Society. However, the operational and control environment for jet engine operations differs considerably from that for industrial jet turbines. In referencing prior art publications or patents as background herein, no representation is made that the cited subject matter is the best prior art.

In connection with prior art gas turbine electric power plant operating and control systems and operating methods therefor, reference is made to copending related application Ser. No. 082,470 which, in conjunction with other enumerated related patent applications, comprises a description of an improved gas turbine plant operating and control system. The present disclosure represents a further advancement over the prior art discussion herein contained and should be considered as exclusive of the referenced application.

Generally, the operation of industrial gas turbine apparatus and gas turbine power plants has been limited in flexibility, response speed, accuracy and reliability. Further limits have existed in the efficiency or economy with which single or multiple units are placed under operational control and management. Control loop arrangements and control system embodiments of such arrangements for industrial gas turbines have been less effective in operations control than is desirable. Limits have also existed on how close industrial gas turbines can operate to the turbine design limits over various speed and/or load ranges.

More particularly, in gas turbine control, substantially continuous monitoring of turbine parameters accurately reflecting operating conditions at the various operation cycle positions is essential. Optimum operation over a wide range of operating conditions can be assured only by such monitoring and by reliable, accurate control loop response to variations in one or more of such parameters. Further, certain critical parameters must be continuously sensed in order to prevent damage to combustor elements, hot parts, rotor blades, etc., in the event of over-temperature or overload conditions.

Process sensors of various types have been employed to furnish control system inputs. For example, temperature and pressure sensors have been located at various turbine cycle positions and in varying configurations.

Accurate reliable temperature and pressure indications have been increasingly recognized as essential to maintaining the integrity of a system having one or more control loops wherein it is sought to control turbine speed or load in response to a temperature and/or pressure derived fuel demand signal. During turbine startup, accurate combustor shell pressure indications have been found to be of particular importance. Again, under load accurate pressure readings may become essential to efficient operation.

During those modes of operation characterized principally by temperature conrol, the accuracy and reliability of such indications determine the degree to which optimum operating conditions may be attained. A description of an improved control system employing optimally arranged turbine system thermocouples, suitable for use in the gas turbine electric power plant of the present invention, may be found in copending application Ser. No. 155,905.

As gas turbine automatic control system developed, it became increasingly essential to obtain reliable temperature and pressure indications for use as control parameters in developing a fuel control input in the various control modes of operation. It became necessary to continuously review such measurements, not only for the purpose of assuring reliable, safe operation, but further to insure the availability of control variables which would enable efficient operation of the gas turbine near design limits to thereby enhance overall efficiency of the automatic control system. Known prior art control systems have lacked a facility for deriving consistently accurate control variables representative of critical parameters such as turbine inlet temperature, combustor shell pressure and turbine exhaust temperatures.

Although known prior art gas turbine control systems have provided multiple control loops in part responsive to temperature and pressure inputs, difficulties in obtaining continuous control over all operating modes has persisted, in a large part, as a result of an inability to obtain precise temperature and pressure inputs over a broad range of operating conditions. Over some portions of gas turbine operation, for example, temperature measuring errors and poor response of temperature measuring instrumentation have produced thermal lag so that response to step impulse inputs has been inadequate to achieving the highly responsive and flexible control necessary in most applications of gas turbine apparatus. Clearly, an alternative to temperature control has been indicated, in order to reduce undesirable thermal transients. Controlling as a function of combustor shell pressure over this interval of gas turbine operation presents an immediate alternative. However, problems have persisted in such control as hereinbefore indicated.

Problems encountered in controlling fuel system operation as a function of compressor shell pressure during gas turbine start-up and during subsequent modes of operation have indicated reliance on other operating parameters to achieve positive control during this time interval. Characteristically, such systems have not provided adequate control over a broad range of ambient temperatures. Variations in such ambient temperatures are known to cause significant variations in internal temperatures which may shorten the life of turbine components, such as blading and the like. A characteristic prior art control system calls for an initial shot of fuel upon detection of flame at light-off, with a subsequent cut-back from the initial impulse level to reduce thermal shock to hot path parts. At the end of the warm-up period, positive control is resumed as a function of temperature or acceleration. Clearly, such control is inadequate to preventing the effects of thermal transient or thermal shock to the critical turbine components.

Various methods and apparatus exist for obtaining, calibrating and displaying instantaneous values of critical turbine operating parameters. Characteristically, however, calibration of various instrumentation employed in obtaining control system inputs has been limited to a one-time setting prior to turbine start-up of instruments to indicate extreme values on a known scale, e.g., alignment of the particular dial at the zero and maximum setting, for example, a combustor shell pressure transducer provides readings from zero to 160 psig. Previously, calibration procedures had suggested an alignment of a dial at zero and 160 with an implicit assumption that increments between the two extreme values will be linearly a function of combustor shell pressure. Nowhere is there suggested in known prior art control systems a facility for dynamically correcting for transducer error. Prior art controllers have had no facility for remembering the zero point as read when the unit was shut down so that re-zeroing might be accomplished during gas turbine operation. For the foregoing and for other reasons, difficulties have existed in obtaining the reliable, accurate combustor shell pressure indications necessary to the provision of responsive surge control during gas turbine start-up and during the other operating modes of industrial gas turbine apparatus. Dynamic calibration techniques have been lacking so that calibration before start-up has been relied upon exclusively. Specifically a variety of field experiences have demonstrated particular problems in calibrating combustor shell pressure transducers so that they repeat exactly to a zero reading after shut-down. The readings in the vicinity of zero pounds are very critical during the initial light-off period since, as discussed previously, combustor shell pressure is desirably considered in preventing compressor surge during this period. Variations in zero setting cause greatly varying light-off temperature control as verified by recorder traces taken in the field. Certain, otherwise adequate control algorithms and systems dictate inhibition of start-up if the pressure transducer is uncalibrated by more than one half pound at the zero point. Thus the problem of transducers repeating to zero pounds has affected availability and reliability.

SUMMARY OF THE INVENTION

One or more industrial gas turbines or gas turbine power plants are operated by a control system which preferably is a programmed digital computer in a hybrid control system arrangement preferably to control fuel flow and thereby provide load and loading rate control over the turbine and generator or other load unit and further provide speed, surge and temperature limit control with nonlinear control loop characterization. Control loop integrity is enhanced by dynamic testing of control system input parameters and correction of process instrumentation calibration errors.

More specifically, as regards control system actions in response to deviation of process sensor inputs from predetermined calibrated limits, programmed computer operations are performed on a periodic basis to correct predictable excursions so that error free control variables are available for further processing. Combustor shell pressure readings are thus corrected to provide highly accurate compressor surge limiting essential to accurate fuel scheduling during critical light-off period.

BRIEF DESCRIPTION OF THE DRAWINGS

FIGS. 4-6 show a fuel nozzle and parts thereof employed in the gas turbine of FIG. 3;

FIGS. 7 and 8 respectively show schematic diagrams of gas and liquid fuel supply systems employed with the gas turbine of FIG. 3;

FIG. 9 shows a block diagram of a digital computer control system employed to operate the gas turbine power plant of FIG. 1;

FIGS. 12, 13 and 14 illustrate various curve data employed in the control system computer in the operation of the gas turbine power plant;

DESCRIPTION OF THE PREFERRED EMBODIMENT

A. POWER PLANT

1. General Structure

Figure 1:
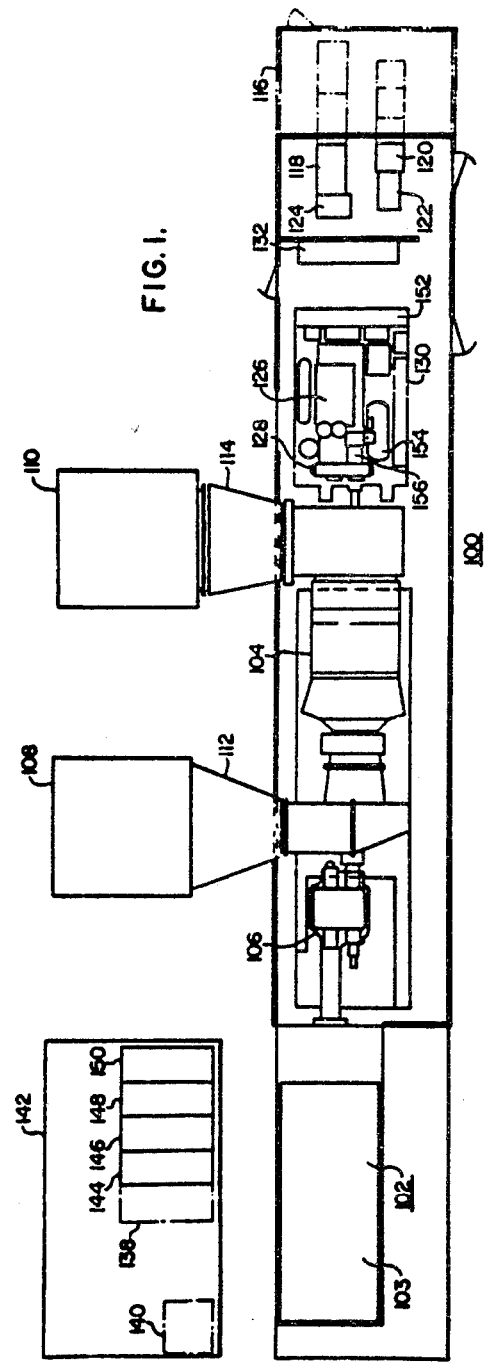
FIG. 1 shows a top plan view of a gas turbine power plant arranged to operate in accordance with the principles of the invention.

More particularly, there is shown in FIG. 1 a gas turbine electric power plant 100 which includes an AC generator 102 driven by a combustion or gas turbine 104 through a reduction gear unit 106. In this application of the invention, the gas turbine 104 is the W-251G simple cycle type manufactured by Westinghouse Electric Corporation. In other power plant generator applications, other industrial drive applications, and combined steam and gas cycle applications of various aspects of the invention, industrial gas turbines having larger or smaller power ratings, different cycle designs, different number of shafts or otherwise different from W-251G can be employed.

The plant 100 may be housed in an enclosure (not shown) and then placed on a foundation approximately 106 to 115 feet long dependent upon the number of optional additional plant units to be accommodated thereon. Up to three additional units may be provided. Exhaust silencers 108 and 110 coupled respectively to inlet and exhaust duct works 112 and 114 significantly reduce noise characteristicly associated with turbine power plants.

Digital computer and other control systems circuitry in a cabinet 118 provides for operation of the power plant 10 when a single plant unit is selected by the user. Associated therewith is an operator's panel 120, an automatic send/receive printer 122 and a protective relay panel 124 for sensing abnormal electric power system conditions. The number of basic master and slave units 118 through 124 provided may vary according as the number of plants being monitored and controlled.

Startup or cranking power for the plant 100 is provided by a starting engine 126 such as a diesel engine. Starting engine 126 is mounted on an auxiliary bedplate and coupled to the drive shaft of the gas turbine 104 through a starting gear unit 128. A DC motor 154 operates through a turning gear 156 which is also coupled to the gas turbine shaft starting gear 128 to drive the gas turbine at turning gear speed.

A motor control center 130 is also mounted on the auxiliary bedplate and it includes motor starters and other devices to provide for operating the various auxiliary equipment items associated with the plant 100.

A plant battery 132 is disposed adjacent to one end of the auxiliary bedplate or skid. The battery provides power for emergency lighting, auxiliary motor loads, and DC computer and other control power for a period following shutdown of the plant 100 due to a loss of AC power. Also included on the auxiliary skid is pressure switch and gauge cabinet 152 which contains the pressure switches, gauges, regulators and other miscellaneous elements needed for gas turbine operation.

A switchgear pad 142 is included in the plant 100 for 15 KV switchgear including the generator breaker as indicated by the reference characters 144, 146 and 148. Excitation switchgear 150 associated with the generator excitation system is also included on the switchgear pad 142.

2. Generator and Exciter

Figure 2:
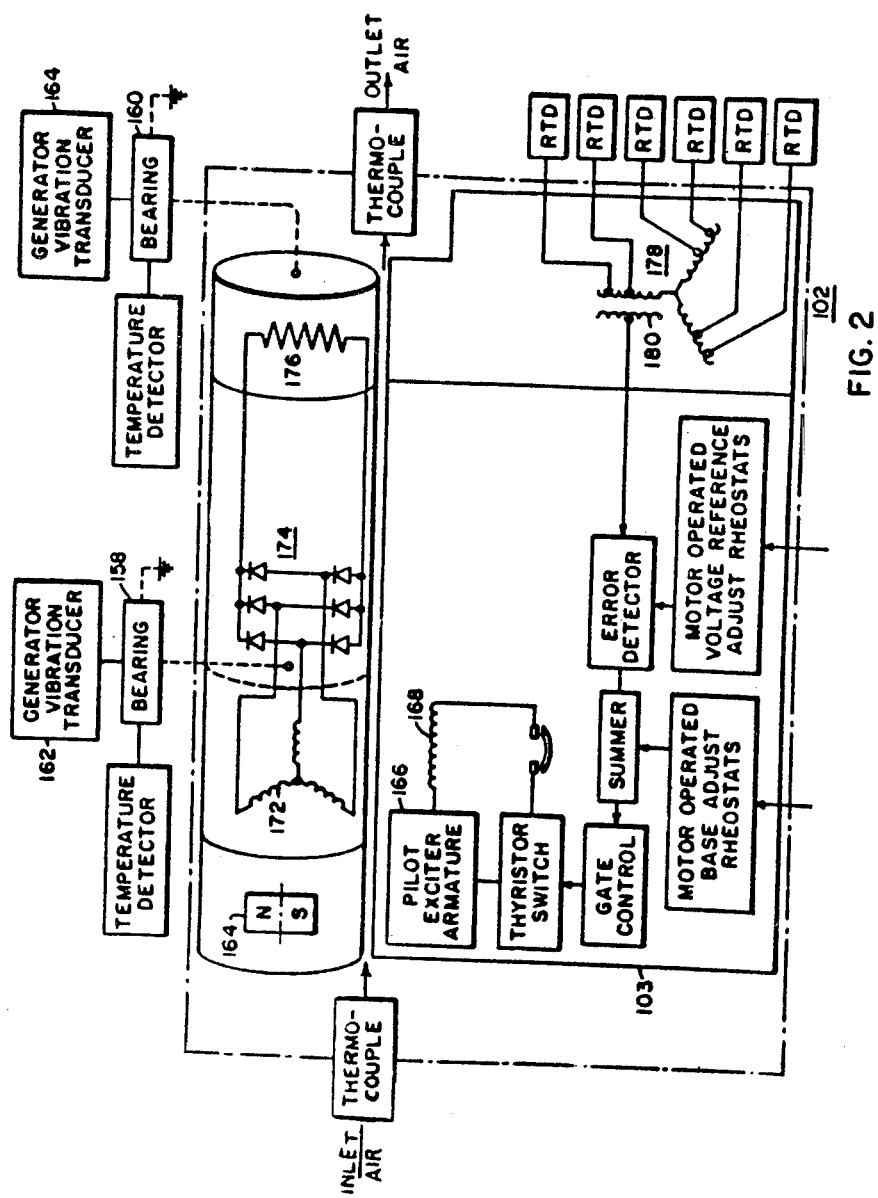
FIG. 2 shows a schematic view of a rotating rectifier exciter and a generator employed in the gas turbine power plant of FIG. 1.

The generator 102 and its brushless exciter 103 are schematically illustrated in greater detail in FIG. 2. Structural details as well as details of operation are considered more fully in the aforementioned copending application Ser. No. 882,470 Section A2, pages 21 to 24.

Briefly, a permanent magnet field member 164 is rotated to induce voltage in a pilot exciter armature 166 which is coupled to a stationary AC exciter field 168 through a voltage regulator 170. Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker when the plant 100 is synchronized and on the line. A transformer 180 supplies a feedback signal for the regulator 170 to control the excitation level of the exciter field 168.

Various monitoring devices to be hereinafter more fully described are provided which generate input data for the plant control system. Included are vibration transducers 162 and 164 resistant temperature detectors embedded in the stator winding and thermocouples installed to measure air inlet discharge temperature and bearing oil drain temperatures. In this manner alarm conditions are provided to the control system. Additional control functions are provided to adjust base adjust rheostats 171 and 177 to provide fine generator voltage control.

3. Gas Turbine a. Compressor

Figure 3:
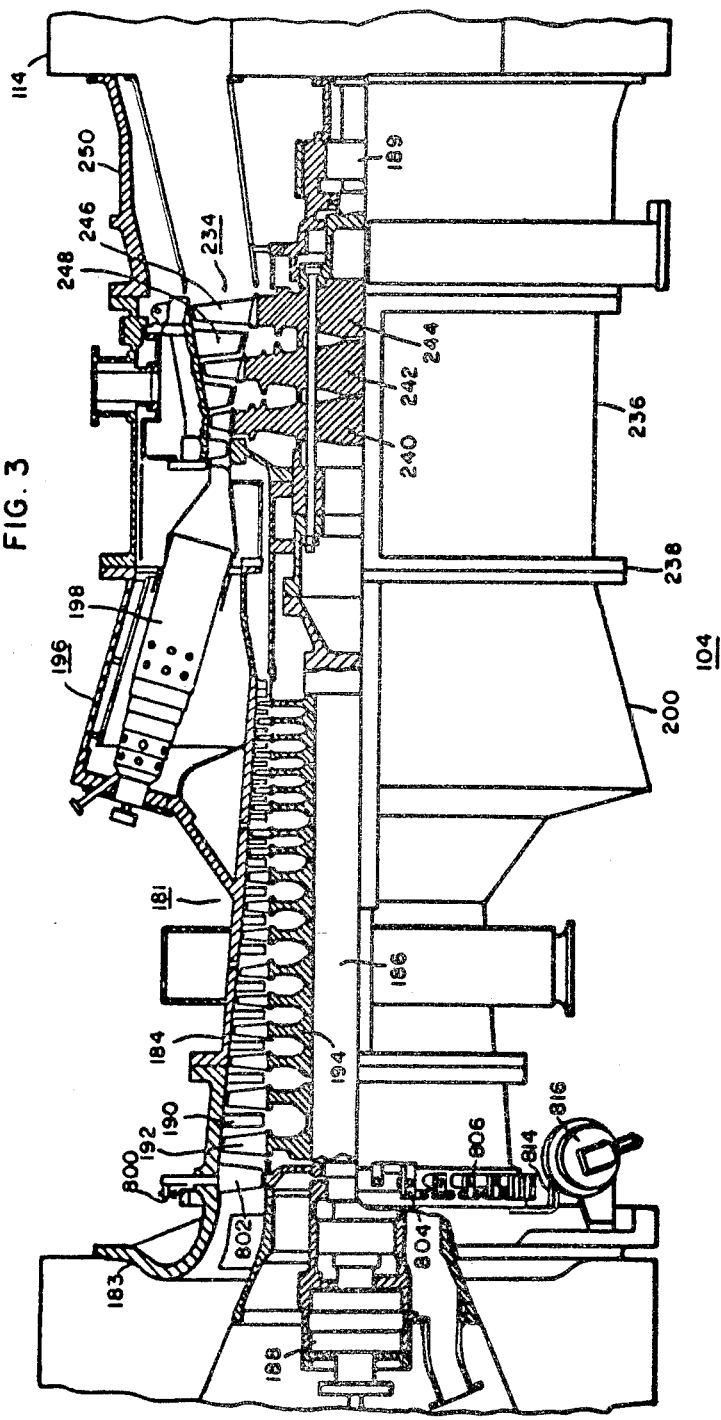
FIG. 3 shows a front elevational view of an industrial gas turbine employed in the power plant to drive the generator and it is shown with some portions thereof broken away.

The gas turbine 104 in this case is the single shaft simple cycle type having a standard ambient pressure ratio of 9.0 to 1 and a rated speed of 4894 rpm and it is illustrated in greater detail in FIG. 3. Filtered inlet air enters a multistage axial flow compressor 181 through a flanged inlet manifold 183 from the inlet ductwork 112. An inlet guide vane assembly 182 includes vanes supported across the compressor inlet to provide for surge prevention particularly during startup. The angle at which all of the guide vanes are disposed in relation to the gas stream is uniform and controlled by a pneumatically operated positioning ring coupled to the vanes in the inlet guide vane assembly 182.

The compressor 181 is provided with a casing 184 which is split into base and cover parts along a horizontal plane. The turbine casing structure including the compressor casing 184 provides support for a turbine rotating element including a compressor rotor 186 through bearings 188 and 189. Vibration transducers (FIG. 9) are provided for the gas turbine bearings 188 and 189.

The compressor casing 184 also supports stationary blades 190 in successive stationary blade rows along the air flow path. Further, the casing 184 operates as a pressure vessel to contain the air flow as it undergoes compression. Bleed flow is obtained under valve control from intermediate compressor stages to prevent surge during startup.

The compressor inlet air flows annularly through a total of eighteen stages in the compressor 181. Blade 192 mounted on the rotor 186 by means of wheels 194 are appropriately designed from an aerodynamic and structural standpoint for the intended service. A suitable material such as 12% chrome steel is employed for the rotor blades 192. Both the compressor inlet and outlet air temperatures are measured by suitably supported thermocouples (FIG. 9).

b. Combustion System

Pressurized compressor outlet air is directed into a combustion system 196 comprising a total of eight combustor baskets 198 conically mounted within a section 200 of the casing 184 about the longitudinal axis of the gas turbine 104. In accordance with one aspect of the principles of the present invention control system inputs representative of combustor shell pressure are obtained by a suitable strategically located, sensor (FIG. 9) coupled to the compressor combustor flow paths located in the pressure switch and gauge cabinet 152. The pressure detector/transducer can for example, be one such as that described in Product Bulletin (PB)-107-109 published by Hagan Computer and Instrumentation Division of Westinghouse Electric Corporation and designated "Transducer High Pressure Model-109".

As schematically illustrated in FIG. 4, the combustor baskets 198 are cross-connected by cross-flame tubes 202 for ignition purposes. A computer sequenced ignition system 204 includes igniters 206 and 208 associated with respective groups of four combustor baskets 198. In each basket group, the combustor baskets 198 are series cross-connected and the two groups are cross-connected at one end only as indicated by the reference character 210.

Generally, the ignition system 204 includes an ignition transformer and wiring to respective spark plugs which form a part of the igniters 206 and 208. The spark plugs are mounted on retractable pistons within the igniters 206 and 208 so that the plugs can be withdrawn from the combustion zone after ignition has been executed.

A pair of ultraviolet flame detectors 212 are associated with each of the end combustor baskets in the respective basket groups in order to verify ignition and continued presence of combustion in the eight combustor baskets 198. The flame detectors 212 can for example be Edison flame detectors Model 424-10433.

In FIG. 5, there is shown a front plan view of a dual fuel nozzle mounted at the compressor end of each combustor basket 198. An oil nozzle 218 is located at the center of the dual nozzle 216 and an atomizing air nozzle 220 is located circumferentially about the oil nozzle 218. An outer gas nozzle is disposed about the atomizing air nozzle 220 to complete the assembly of the fuel nozzle 216.

As indicated in the broken away side view in FIG. 6, fuel oil or other liquid fuel enters the oil nozzle 218 through a pipe 224 while atomizing air for the fuel oil enters a manifold pipe arrangement 226 through entry pipe 228 for flow through the atomizing air nozzle 220. Gaseous fuel is emitted through the nozzle 222 after flow through entry pipe 230 and a manifold pipe arrangement 232.

c. Fuel

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane.

With respect to liquid fuels, the fuel viscosity must be less than 110 SSU at the nozzle to assure proper atomization. Most distillates meet this requirement.

A portion of the compressor outlet air flow combines with the fuel in each combustor basket 198 to produce combustion after ignition and the balance of the compressor outlet air flow combines with the combustion products for flow through the combustor basket 198 into a multistage reaction type turbine 234 (FIG. 3). The combustor casing section 200 is coupled to a turbine casing 236 through a vertical casing joint 238. No high pressure air or oil seal is required between the compressor 181 and the turbine 234.

d. Turbine Element

The turbine 234 is provided with three reaction stages through which the multiple stream combustion system outlet gas flow is directed in an annular flow pattern to transform the kinetic energy of the heated, pressurized gas into turbine rotation, i.e. to drive the compressor 181 and the generator 102. The turbine rotor is formed by a stub shaft 240 and three disc blade assemblies 240, 242 and 244 mounted on the stub shaft by through bolts. Thermocouples (FIG. 9) are supported within the disc cavities to provide cavity temperature signals for the control system.

High temperature alloy rotor blades 246 are mounted on the discs in forming the disc assemblies 240, 242 and 244. Individual blade roots are cooled by air extracted from the outlet of the compressor 181 and passed through a coolant system in the manner previously indicated. The blade roots thus serve as a heat sink for the rotating blades 246. Cooling air also flows over each of the turbine discs to provide a relatively constant low metal temperature over the unit operating load range.

In addition to acting as a pressure containment vessel for the turbine 234, the turbine casing 236 supports stationary blades 248 which form three stationary blade rows interspersed with the rotor blade rows. Gas flow is discharged from the turbine 234 substantially at atmospheric pressure through a flanged exhaust manifold 250 to the outlet ductwork 114.

Figure 15:
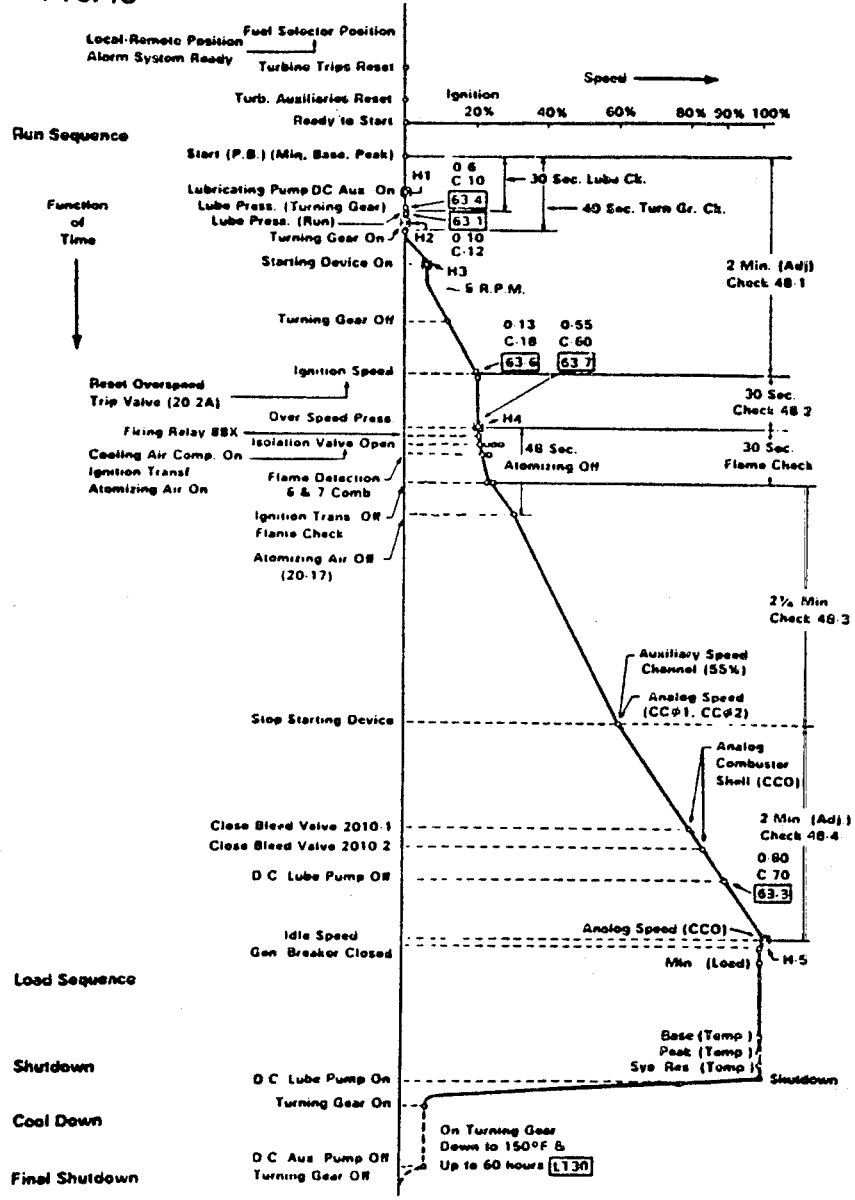
FIG. 15 shows a sequence chart for startup and shutdown of the gas turbine power plant.

The generator and gas turbine vibration transducers (FIG. 9) can be conventional velocity transducers or pickups which transmit basic vibration signals to a vibration monitor for input to the control system. A pair of conventional speed detectors (FIGS. 9 and 15A) are associated with a notched magnetic wheel (FIG. 15A) supported at appropriate turbine-generator shaft locations. Signals generated by the speed detectors are employed in the control system in determining power plant operation.

Thermocouples (FIG. 9) are associated with the gas turbine bearing oil drains. Furthermore, thermocouples (FIG. 9) for the blade path are supported about the inner periphery of the exhaust manifold 250 to provide a fast response indication of blade temperature for control system usage particularly during plant startup periods. Exhaust temperature detectors (FIG. 9) are disposed in the exhaust ductwork 114 primarily for the purpose of determining average exhaust temperature for control system usage during load operations of the power plant 100. Suitable high response shielded thermocouple for the gas turbine 104 are those which use compacted alumina insulation with a thin-wall high alloy swaged sheath or well supported by a separate heavy wall guide.

e. Fuel System

A fuel system 251 is provided for delivering gaseous fuel to the gas nozzles 222 under controlled fuel valve operation as schematically illustrated in FIG. 7. Gas is transmitted to a diaphragm operated pressure regulating valve 254 from the plant gas source. A pressure switch 255 provides for transfer to oil fuel at a low gas pressure limit. Pressure switches 257 and 259 provide high and low pressure limit control action on the downstream side of the valve 254. It is noted at this point in the description that IEEE switch-gear device numbers are generally used herein where appropriate as incorporated in American Standard C37.2-1956.

A starting valve 256 determines gas fuel flow to the nozzles 222 at turbine speeds up to approximately 10% rated flow, and for this purpose it is pneumatically positioned by an electropneumatic converter 261 in response to an electric control signal. At gas flow from 10% to 100% rated, a throttle valve 258 determines gas fuel flow to the nozzles 222 under the pneumatic positioning control of an electropneumatic converter 263 and a pneumatic pressure booster relay 265. The converter 263 also responds to an electric control signal as subsequently more fully considered.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere if the trip valve 260 and an on/off pneumatically operated isolation valve 264 are both closed. The isolation valve fuel control action is initiated by an electric control signal applied through the pressure switch and gauge cabinet 152 (FIG. 1 and FIG. 9). A pressure switch 267 indicates fuel pressure at the inlet to the nozzle 222.

As schematically shown in FIG. 8, a liquid fuel supply system 26 provides for liquid fuel flow to the eight nozzles 218 from the plant source through piping and various pneumatically operated valves by means of the pumping action of a turbine shaft driven main fuel pump 268. Pump discharge pressure is sensed for control system use by a detector 269. A bypass valve 271 is pneumatically operated by an electropneumatic converter 270 and a booster relay 272 to determine liquid fuel bypass flow to a return line and thereby regulate liquid fuel discharge pressure. An electric control signal provides for pump discharge pressure control, and in particular it provides for ramp pump discharge pressure control during turbine startup. A throttle valve 272 is held at a minimum position during the ramp pressure control action on the discharge pressure regulator valve 270. A pressure switch 269 provides for DC backup pump operation on low pressure, and a pressure switch 271 indicates whether the pump 268 has pressurized intake flow.

After pressure ramping, the pneumatically operated throttle valve 272 is positioned to control liquid fuel flow to the nozzle 218 as determined by an electropneumatic converter 274 and a booster relay 276. An electric control signal determines the converter position control action for the throttle valve 272. The bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, in the gas fuel system 251, an electrically actuated and pneumatically operated isolation valve provides on/off control of liquid fuel to a liquid manifold 283.

Eight positive displacement pumps 284 are respectively disposed in the individual liquid fuel flow paths to the nozzles 218. The pumps 284 are mounted on a single shaft and they are driven by the oil flow from the manifold 283 to produce substantially equal nozzle fuel flows. Check valves 286 prevent back flow from the nozzles 218 and a pressure switch 288 indicates fuel pressure at the oil nozzle 218. A manifold drain valve 290 is pneumatically operated under electric signal control during turbine shutdown to drain any liquid fuel remaining in the manifold 283.

4. Plant Performance Characteristics

Details concerning plant performance characteristics are contained in the aforementioned related application Ser. No. 082,470, Section A4, pages 32 to 36.

B. Power Plant Operation And Control

1. General

The preferred embodiment of the integrated turbine generator control system 300 (FIG. 9) employs analog digital computer circuitry to provide sequenced start-stop plant operation, monitoring and alarm functions for plant protection and accurately, reliably and efficiently performing speed/load control during plant startup, running operation and shutdown. The plant control system 300 is characterized with centralized systems packaging having a single operator's panel and embracing elements disposed in the control cabinet 118, the pressure switch and gauge cabinet 152 and other elements included in the electric power plant 100 of FIG. 1. If multiple plants like the power plant 100 are to be operated, plural control cabinets may be required to provide the additional circuitry needed for the additional plant operations.

The control philosophy embodied in the control system 300 provides flexible operator/control system interfaces. Under automatic control, the power plant 100 can be operated under local operator control or it can be attended and operated by direct wired remote or supervisory control.

2. Control Loop Arrangement—Characterization

Figure 10:
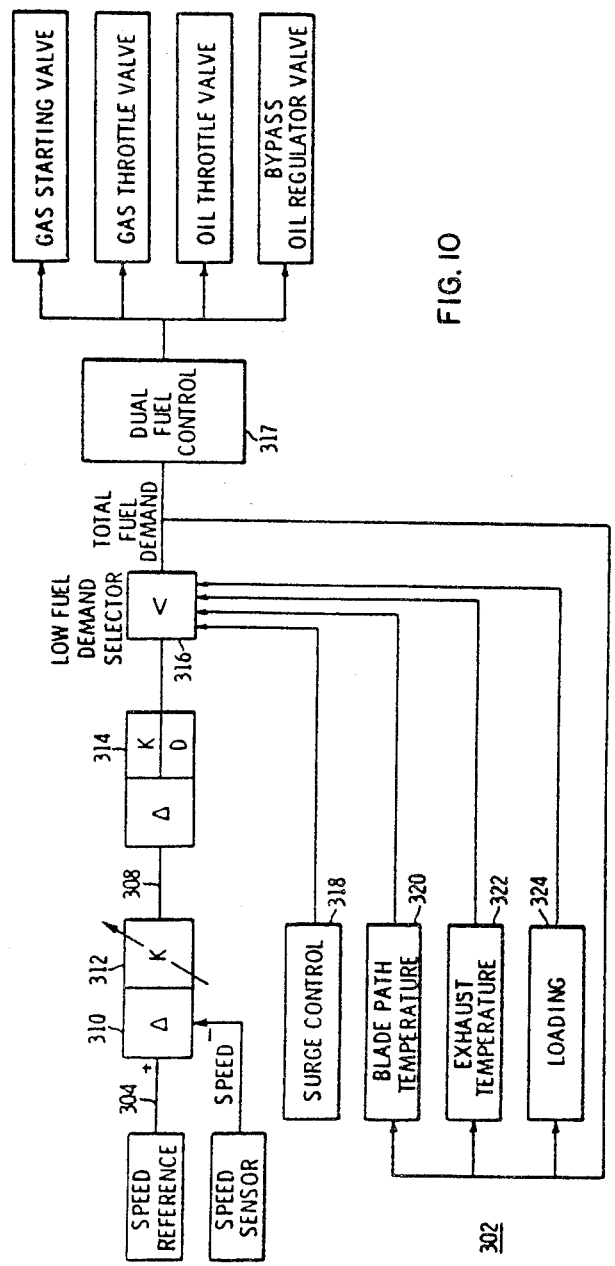
FIG. 10 shows a block diagram of a control loop which may be employed in operating the computer control system of FIG. 9 and the power plant of FIG. 1.

In FIG. 10 a control loop arrangement 302 represented by SAMA standard function symbols characterizes the preferred general control looping embodied in the preferred control system 300 and applicable in a wide variety of other applications of the invention. Reference is made to the aforementioned copending application Ser. No. 082,470, Section B2, pages 39 to 51, wherein there is contained a more detailed discussion of the control loop 302.

Briefly, the control loop arrangement 302 comprises an arrangement of blocks in the preferred configuration of process control loops for use in operating the gas turbine power plant 100 or other industrial gas turbine apparatus. No delineation is made in FIG. 10 between hardware and software elements since many aspects of the control philosophy can be implemented in hard or soft form. However, it is noteworthy that various advantages are gained by hybrid software/hardware implementation of the control arrangement 302 and preferably by implementation in the hybrid form represented by the control system 300.

Generally, in the various control mode sequences to be hereinafter more fully discussed, the plant 100 is started from rest under control of loop 302, accelerated under accurate and efficient control to synchronous speed, preferably in a normal fixed time period, synchronized manually or automatically with the power system, and loaded under preferred ramp control to a preselectable constant or temperature limit controlled load level, thereby providing better overall power plant management.

In the combination of plural control loop functions in the arrangement 302, a low fuel demand selector block 316 is preferably employed to limit the speed reference fuel demand representation if any of three limit representations are exceeded by it during startup. These limit representations are generated respectively by a surge control 318, a blade path temperature control 320, and an exhaust temperature control 322. In this application, a load control block 324 becomes operative after synchronization with the limit blocks 318, 320 and 322. Thus, the operation of the plural control loop 302 as a function of the various limit representations varies during the various control modes of operation.

At the output of the low fuel demand selector 316 the fuel demand representation is applied to a dual fuel control 317 where the fuel demand signal is processed to produce a gas fuel demand signal for application to the gas starting and throttle valves or a liquid fuel demand signal for application to the oil throttle and pressure bypass valve or as a combination of gas and liquid fuel demand signals for application to the gas and oil valves together.

In order to start the plant 100, the control system 300, operating in control Mode O, requires certain status information generated by the various process sensors. Once it is logically determined that the overall plant status is satisfactory, the plant startup is initiated. Plant devices are started in parallel when possible to increase plant availability for power generation purposes.

As control is transferred through the various control modes a feedforward characterization is preferably used to determine representation of fuel demand needed to satisfy speed requirements. Measured process variables including turbine speed, the controlled load variable or the plant megawatts, combustor shell pressure and turbine exhaust temperature are employed to limit, calibrate or control the fuel demand so that apparatus design limits are not exceeded. The characterization of the feedforward speed fuel demand, a surge limit fuel demand and a temperature limit fuel demand are preferably non-linear in accordance with the non-linear characteristics of the gas turbine to achieve more accurate, more efficient, more available and more reliable gas turbine apparatus operation. The control arrangement 302 has capability for maintaining cycle temperature, gas turbine apparatus speed, acceleration rate during startup, loading rate and compressor surge margin.

The fuel demand in the control arrangement 302 provides position control for turbine gas or liquid fuel valves. Further, the control arrangement 302 can provide for simultaneous burning of gas and liquid fuel and it can provide for automatic bumpless transfer from one fuel to the other when required.

As will be appreciated from the foregoing discussion control arrangement 302 is implemented such that different process variables are given greater weight in determining the control function to be performed as control progresses sequentially through the various modes of operation. Attention is directed to the critical startup period from light off to attainment of synchronous speed. It is within this time frame of reference that surge control is of particular importance in minimizing risk of exceeding gas turbine design temperature limits. The surge control 318 includes a characterization block 325 which responds to sensed combustor shell pressure and compressor inlet temperature to generate the surge limit representation for compressor surge prevention as illustrated in FIG. 11B.

Referring to FIG. 12, the curve 326 limits startup fuel demand for an ambient temperature of 120° F. and the curve 328 limits startup fuel demand for an ambient temperature demand of −40° F. (Common curve portions 330 are operative to provide a substantially linear surge limit during subsequent load operations.

Figure 11C:
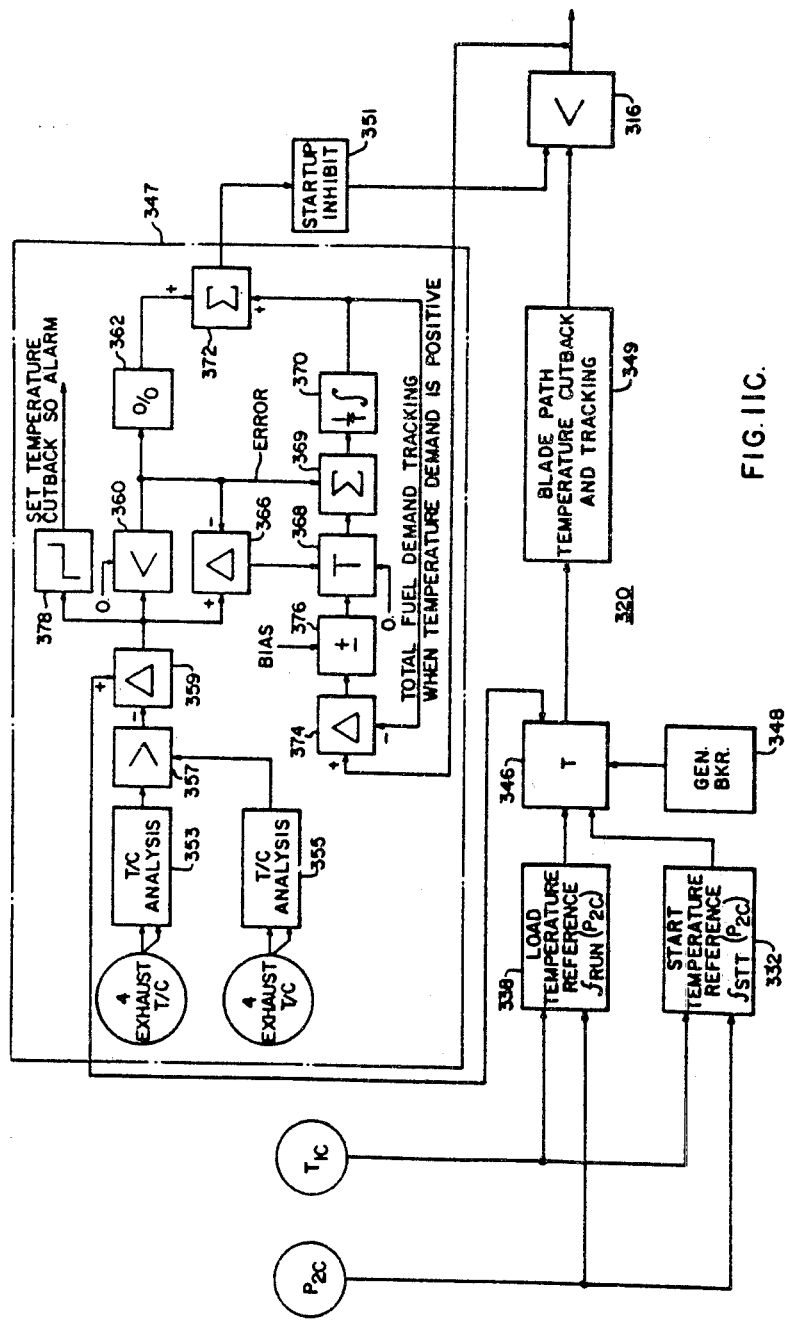
FIGS. 11A-B show schematic diagrams of control loops which may be employed in operating the computer control system of FIG. 9 and the power plant of FIG. 1.
Figure 13:
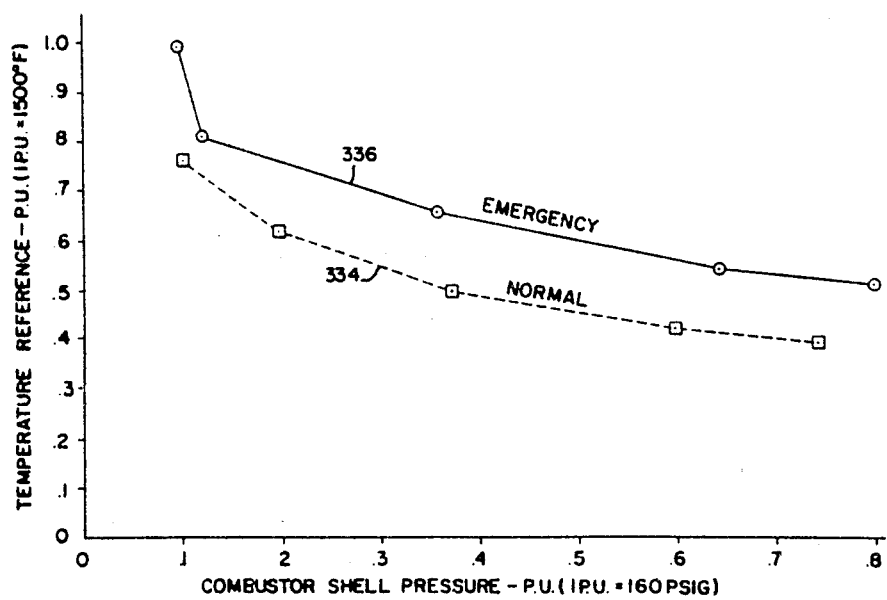
Figure 14:
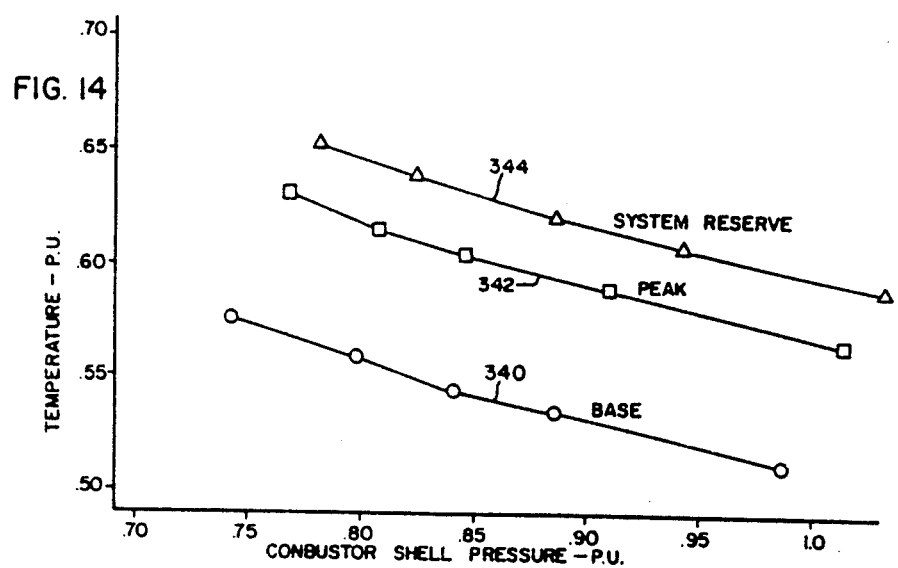

As shown in FIG. 11C, the blade path temperature control 320 includes a block 332 which responds to combustor shell pressure in accordance with a preferably nonlinear temperature reference characteristic 334 for normal startup and a second preferably nonlinear temperature reference characteristic 336 for emergency startup as illustrated in FIG. 13. The exhaust temperature control 322 includes a block 338 which responds to combustor shell pressure in accordance with temperature reference characteristic 340 for base load operation, 342 for peak load and 344 for system reserve load operation as shown in FIG. 14. Again each characteristic is preferably nonlinear. The startup curves 334 and 336 correspond respectively to 1200° F. and 1500° F. turbine inlet temperature while the load curve correspond to respectively higher values of turbine inlet temperature operations.

The control loop features described above provide the most accurate and reliable turbine control during startup operations, i.e., over the operation time interval indicated control as a function of combustor shell pressure is found to be the most reliable. Difficulties in metering fuel and firing at low speeds are overcome. Low air flow, further complicated by temperature measuring errors and slow response of temperature sensors creates a control environment in which parametric fuel scheduling, required to reduce thermal transients, is highly desirable. Thermal shock, contributing to considerable wear and early deterioration of turbine components, is significantly reduced.

As will be hereinafter more fully described, the control system is implemented in accordance with the principles of the present invention provides for positive highly responsive control over all modes of turbine operation. The low fuel demand select features in the described system allow precise control consistent with satisfying the most appropriate constraint at any given time. Instruments known to provide the best indications of operating conditions at any given time are calibrated dynamically yielding error free control variables, significantly enhancing accurate response.

Control over early time intervals as a function of combustor shell pressure eliminates problem encountered in systems wherein approximate fuel requirements dictate initial scheduling at a level corresponding to an impulse step control input. As seen by a reference to FIGS. 12, 13 and 14, temperature and pressure is simultaneously considered in deriving a most favorable fuel schedule for efficient operation.

3. Control System

The control system 300 is shown in block diagram detail in FIG. 9. It includes a general purpose digital computer system comprising a central processor 304 and associated input/output interfacing equipment such as that sold by Westinghouse Electric Corporation under the trade name Prodac 50 (P50). Generally, the P50 computer system employs a 16,000 word core memory, with a word length of 14 bits and a 4.5 microsecond cycle time.

More specifically, the interfacing equipment for the computer 304 includes a contact closure input system 306 and a conventional analog input system 308. Sixtyfour input/output channels each having 14 bit parallel paths into and out of the main frame are provided. Each of the employed interrupt inputs causes a separate and unique response within the computer main frame without need for additional input operations thereby allowing the processing of interrupt input signals with very little main frame duty cycle.

Process inputs are provided by the contact closure input system 306 and the analog input system 308. The contact closure input (CCI) system is coupled to the operator console panel 120 and remote operator's panel 322. Characteristic CCI's are those related to the starting engine contacts. Also, a facility exists for customer selection of devices to be coupled to the CCI system.

Characteristic inputs to the analog input system 308 are the outputs from the various plant process sensors and detectors, namely, turbine 104 sensors such as blade path and exhaust manifold thermocouples. Additional inputs are those from a combustor shell pressure sensor and the main and backup speed sensors. The speed sensor outputs are coupled to the analog input system 308 through an analog speed control 324 and an auxiliary speed limiter 326, respectively.

The computer supplies essential outputs of various description for display at the operator's console 120 or the like. They are also applied as analog inputs as indicated by reference character 330. The contact closure output system 316 transfers digital speed reference, speed/load limit and fuel transfer outputs to its external circuitry as indicated respectively by the reference characters 332, 334 and 336.

The coupling of the contact closure output system 316 with the analog speed control 324 is within the framework of the preferred software/hardware hybrid control system. Another contact closure output 338 to the analog speed control 324 provides for a minimum fuel flow into the turbine combustor system in order to prevent flameout after ignition.

An analog dual fuel control system 337 is operated by the speed control 324 to determine the position of the liquid and gas fuel valves considered in connection with FIGS. 9 and 10. A contact closure output coupling to the dual fuel control 337 provides for transfer between fuels or relative fuel settings for two fuel or single fuel operation as indicated by the reference character 336.

The contact closure output system 316 is also connected to the operator's panel 120 and to sequence the starting engine 126. A synchronizer detection circuit 342 has bus line and generator potential transformers coupled to its input and the contact closure output system 316 signal provides a visual panel indication for manual synchronization. The detection circuit 342 also supplies signals to the analog input system 308 for automatic synchronization when such synchronization is employed as considered more fully in the aforementioned Reuther and Reed copending patent applications.

Other devices operated by the contact closure outputs include the generator field breaker and the generator line breakers 132 and 137. The motor operator generator exciter field rheostat 171 and 177 and various devices in the motor control center 130 and the pressure switch and gauge cabinet 152 also function in response to contact closure outputs. The printer or teletype 310 is operated directly as a special input/output channel to the main frame 304. A guide vane control circuit 338 is also operated by the speed control 324 to control the position of the guide vanes through a guide vane electropneumatic converter 340 which actuates the positioning mechanism.

The foregoing is an abbreviated specification of a control system employed in implementing the preferred embodiment of the present invention, suitable for use in gas turbine electric power plant control. A more complete discussion of the preferred control system may be found in the aforementioned copending application Ser. No. 082,470, Section B3, pages 51 to 62.

Analog Circuitry

Figure 16A:
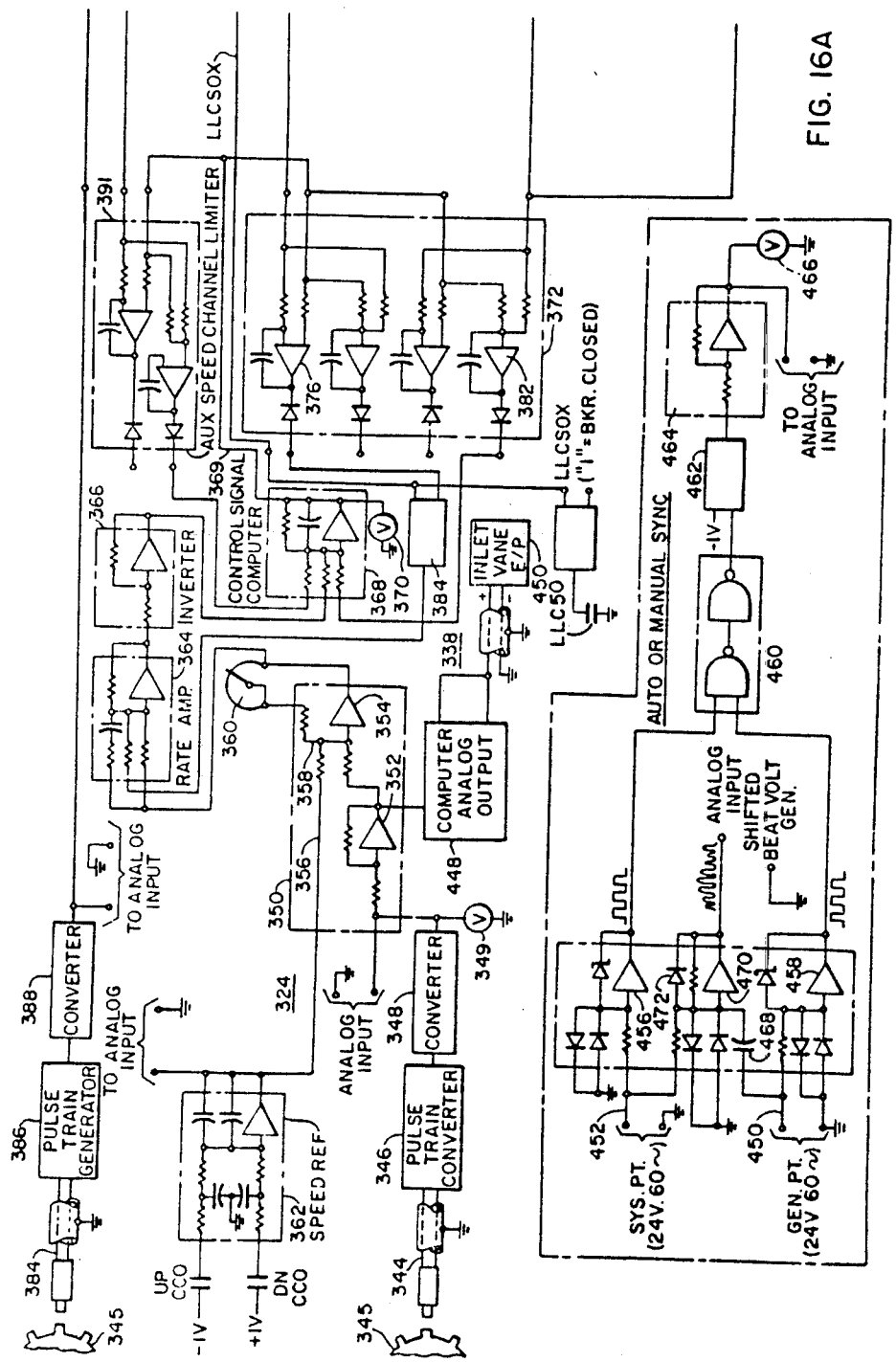
FIGS. 16A and 16B show a schematic diagram of analog circuitry associated with the computer in the control system to provide control over gas turbine fuel supply system operations and certain other plant functions.
Figure 16B:
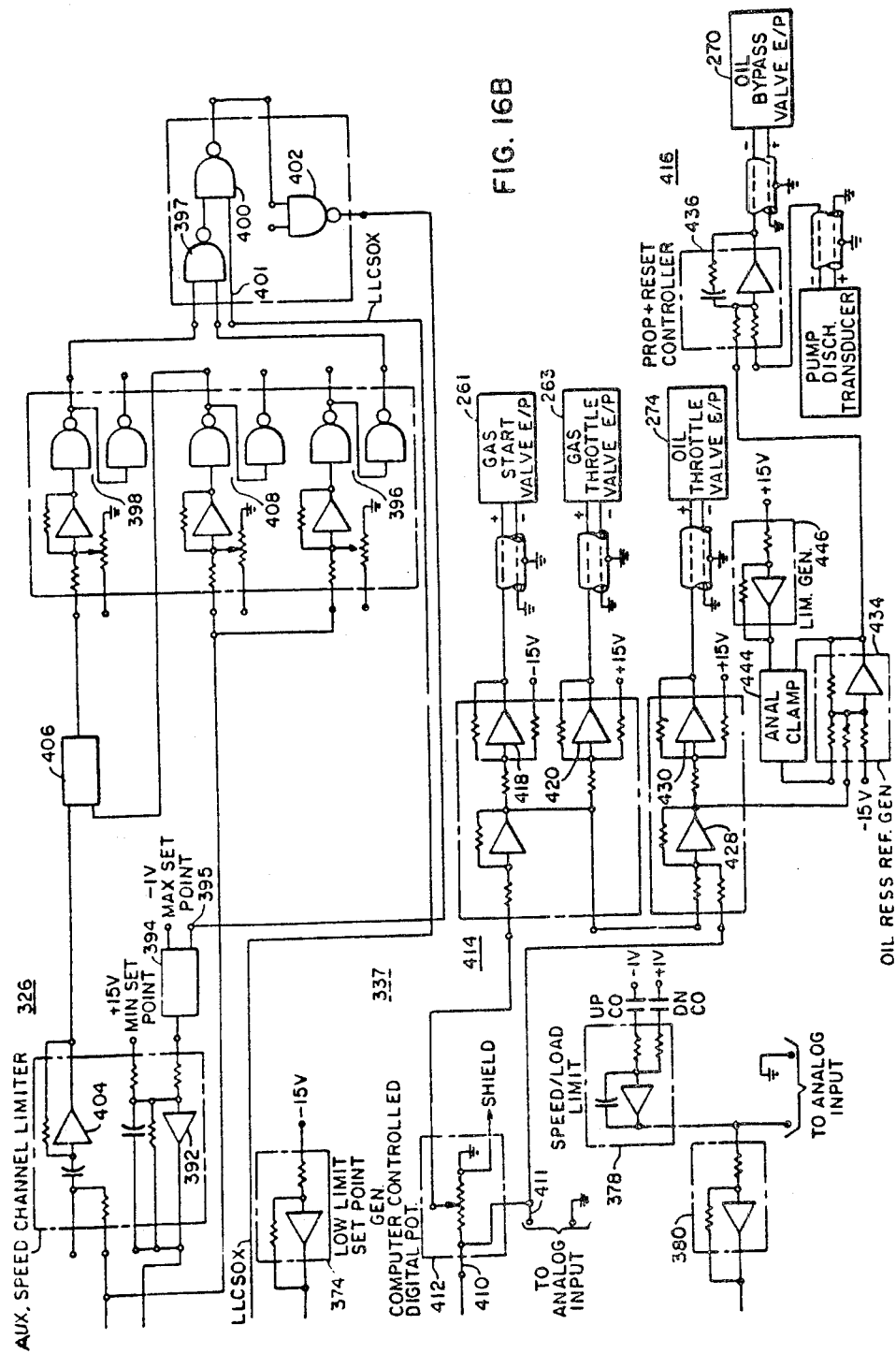

The speed control circuit 324 operates in response to a main speed signal generated by a main turbine speed sensor 344 associated with a 44 tooth magnetic rotor wheel 345 as shown in greater detail in FIG. 16A. The main speed signal is converted into a sinusoidal output waveform having a constant width pulse at twice the input frequency. To derive a representation of the actual turbine speed, circuit block 348 converts the pulse train into a proportional direct voltage output which is then applied to error detector circuit block 350 and to analog input system 308 (FIG. 9).

A speed reference signal 356 derived from an analog output circuit block 362 and a speed regulation feedback signal 358 are also inputs to circuit block 350. The speed reference signal is determined from a digital command value generated by the computer.

Within circuit block 350 actual speed and speed feedback regulation signals are added to the speed reference signals to determine a speed error output signal. In the absence of fuel demand limit action, the speed error, amplified in circuit block 368, is generated on line 369 as the fuel demand signal, or, contact signal output (CSO), and input to the fuel control system 337. Monitoring is provided by meter 370.

Low and high limits are generated by setpoint signal generators 374 and 378 and imposed on the fuel demand signal in circuit block 372 by clamp amplifiers 376 and 382, respectively.

A backup speed limit is imposed on a backup speed limiter 326 in a manner similar to the foregoing. As will be readily appreciated, there exists a one-to-one functional correspondence between circuit elements 344 and 384, 346 and 386, 348 and 388 and other elements shown as similarly disposed in the schematic diagram depicted in FIG. 16A.

Additional clamp amplifier circuit 390 and speed limiter setpoint generator 392 cause the fuel demand signal output from circuit block 368 to be cut back to a predetermined minimum value if either of two logic conditions is satisfied. The first of such conditions is the operation of the turbine in excess of 108% of rated speed. An auxiliary speed signal is applied to the input of comparator circuit 396 which generates an output signal for application to an OR circuit 397 when the speed signal is too high. As shown, AND circuit 402 responds if LLCSOX exists, to generate a switching signal via the logic inverter 402.

In a like manner a speed derivative signal is processed to detect as a second logic condition an excess acceleration between 102% and 108% of rated speed, such that, upon comparison with a predetermined acceleration limit and determination in circuit block 398 that the speed derivative signal is greater, an output to logic switch 394 is generated and coupled to the control input of clamping amplifier 390 as already described. The fuel demand signal generated at the output of the fuel demand amplifier 368 accordingly is representative of the fuel needed to satisfy the computer generated speed reference, the fuel needed to satisfy a computer determined limit action, the low limit fuel demand needed to prevent flameout during normal speed operations, or to cause turbine speed cutback without flameout when overspeed conditions are detected by the auxiliary speed limiter circuit 326.

At an input 410 to the dual fuel control system 337 the fuel demand signal is applied across a computer controlled digital potentiometer 412 which is illustrated schematically as an analog potentiometer. The fuel demand signal is also applied to the computer analog input system 308 for programmed computer operations. The total fuel demand signal is ratioed between the gas fuel control systems 414 and 416 to produce the individual fuel flows which satisfy gas turbine operation demands.

The gas fuel demand signal is applied to signal range adjuster amplifiers 418 and 420 which provide predetermined operation characterization for the gas start valve and the gas throttle valve respectively. A signal range adjuster amplifier 424 operates on the liquid fuel demand signal to produce control on the liquid fuel throttle valve electropneumatic converter again, in accordance with a predetermined operation characterization. Additional liquid fuel control is provided by a pressure reference generator 434 and a rate controller 436 which serve to operate the liquid fuel bypass valve electropneumatic converter 270 in accordance with a predetermined pump discharge pressure characterization.

The inlet guide vane control 338 considered previously in connection with FIG. 9 may include a controller 448 which generates a guide vane position control signal as a linear function of the sensed speed signal derived from the error detector block 350 in the main speed channel. The subject is considered in greater detail in copending related applications Ser. Nos. 205,261 and 189,633.

Additional functions performed by the analog system indicated in FIG. 9, as well as a more definite discussion of those elements enumerated above may be found in copending application Ser. No. 082,470, pages 63 to 74.

Control Panels

The operator's panel considered in connection with FIG. 1 is included as part of an operator's console through which various process control functions may be initiated or altered. Additionally, process monitoring is provided in the form of various meters and alarms.

Among the general control functions provided are the following:
(a) Breaker pushbutton control,
(b) Automatic synchronization ON/OFF,
(c) Synchronizing mode selection.

Control functions which may be included specific to the gas turbine, are as follows:
(a) Normal start/stop,
(b) Emergency start/stop,
(c) Fuel selection,
(d) Automatic fuel transfer.

Flexible generator control is provided in the form of panel functions which permit selection of manual or automatic voltage regulation.

Alarm condition indicators are provided by alarm lights and a horn blow. Typical conditions giving rise to alarm status indications are those pertaining to system failures during startup. Alarms are provided which are associated with specific process monitoring devices such as generator vibration detectors, combustor basket flame detectors, and blade path and exhaust manifold thermocouples. A facility is provided for initiating computer determined alarm status responsive control functions.

In the preferred embodiment increased control flexibility is achieved through the provisions of one or more remote control panels which, desirably, duplicate the functions of the local operator's panel.

A detailed discussion of the control panels may be found in the aforementioned copending application Ser. No. 082,470, at pages 74 through 97 thereof. Included is a listing of local and remote operator's panel contact closure output assignments, and a description of the entering of control parameter changes into the control system 300.

D. PROGRAM SYSTEM

1. General Configuration

Figure 17:
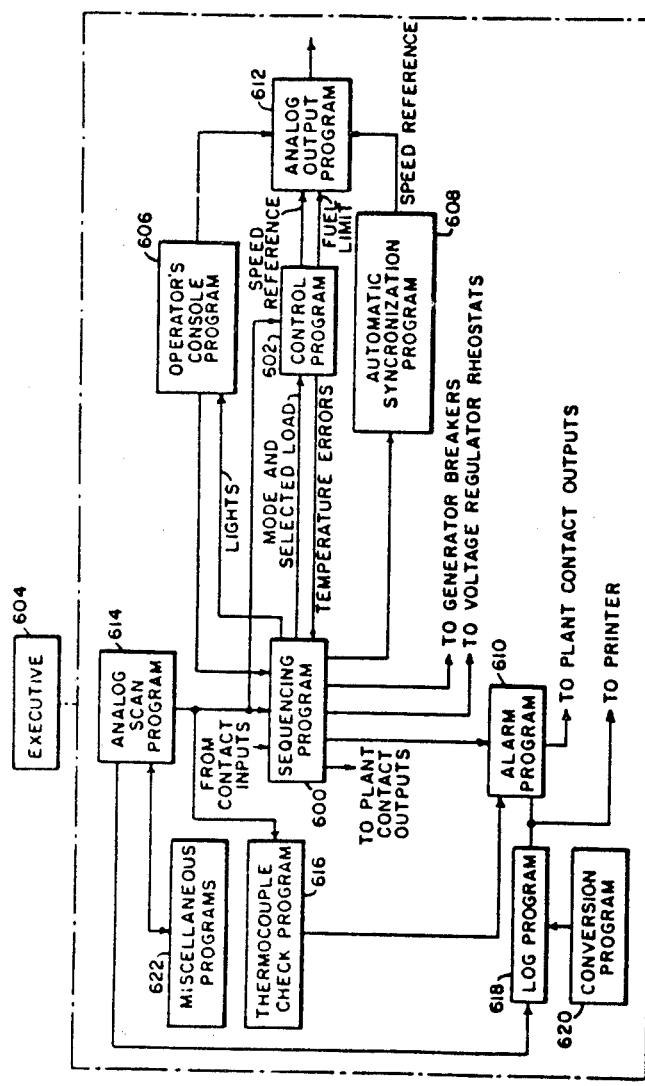
FIG. 17 shows a general block diagram of the organization of a program system employed in the control system computer.

The computer program system is organized to operate the computer system 305 so that it interacts with other control system elements and plant devices to operate the gas turbine plant 100 and other similar plants as required to produce electric power with many user advantages. As schematically illustrated in FIG. 17, the program system comprises a sequencing program 600 and a control program 602 which make most of the plant operational determinations for output to the control system interfacing and control hardware. An executive program 604 schedules the use of the computer 304 by the various programs in the software system in accordance with a predetermined priority structure. The executive program 604 also provides certain other functions considered more fully subsequently.

Generally, the sequencing program 600 accepts contact closure inputs, analog inputs, and operator console inputs from an operator console program 606 to provide through contact closure outputs plant startup and other functions including alarm and housekeeping tasks prior to, during and after startup. As indicated in FIG. 17, the sequencing program 600 supervises the control program 602 by specifying the control mode and the selected load. The control program 602 transmits data to the sequencing program 600 including for example hot blade path temperature indications during load operation which require plant alarm and shutdown.

An automatic synchronization program 608 is also supervised by the sequencing program 600 to provide for generator voltage regulator rheostat operation and turbine speed adjustment during automatic synchronization. The sequencing program 600 processes manual synchronization operation. It also transmits lamp light determinations to the operator's console program 606 and alarm determinations to an alarm program 610.

The operator's console program 606 is a package of subprograms which provides for interfacing the operator's panel 120 with the computer 304. The alarm program 610 proivdes for printout of detected alarms.

During the various modes of plant operation, the control program 602 makes intermediate control determinations which result in the determination of a turbine speed reference representation and a fuel demand limit representation for application as analog signals to the analog speed control 324 as previously described. Analog outputs from the control program 602, the automatic synchronization program 608 and the operator's console program 606 are processed by an analog output pulser program 612 to provide for generation of accurate external analog voltages corresponding to the internal digital determinations. Analog inputs for the sequencing program 600 and the control program 602 and other programs are determined and stored by an analog scan executive program 614.

A thermocouple check program 616 makes a validity check on the thermocouples not checked by the sequencing program 600 or the control program 602 and generates an alarm for alarm program printout when a thermocouple reading indicates an open circuit.

A log program 618 operates in conjunction with a conversion program 620 to generate a periodic printout of the values of predetermined analog-inputs. Other programs included in the program system are classified as miscellaneous programs 622.

2. Executive System

In the program system, the individual programs are repeatedly executed under control of executive program 604, typically with only the program variables changed. An executive priority system consisting of sublevel structured dominant and secondary levels defines the order in which programs are executed.

Dominant sublevel programs are executed according to real time, i.e. a program which is first bid is executed first if two programs are bidding to run simultaneously. Secondary sublevel programs are executed according to a preestablished hierarchy.

3. Programmer's Console Package

The programmer's console programs are provided to facilitate communication with the P50 computer. Generally, the console package provides a means for loading programs into the computer, executing programs, loading constants or instructions and dumping areas of main and extended core memory. Core locations can be dumped in binary on tape or in octal on a keyboard. The programmer's console package operates within the priority structure of the executive program 604, and its elements are generally classified as a part of that program.

4. Operator's Console Program

Figure 22:
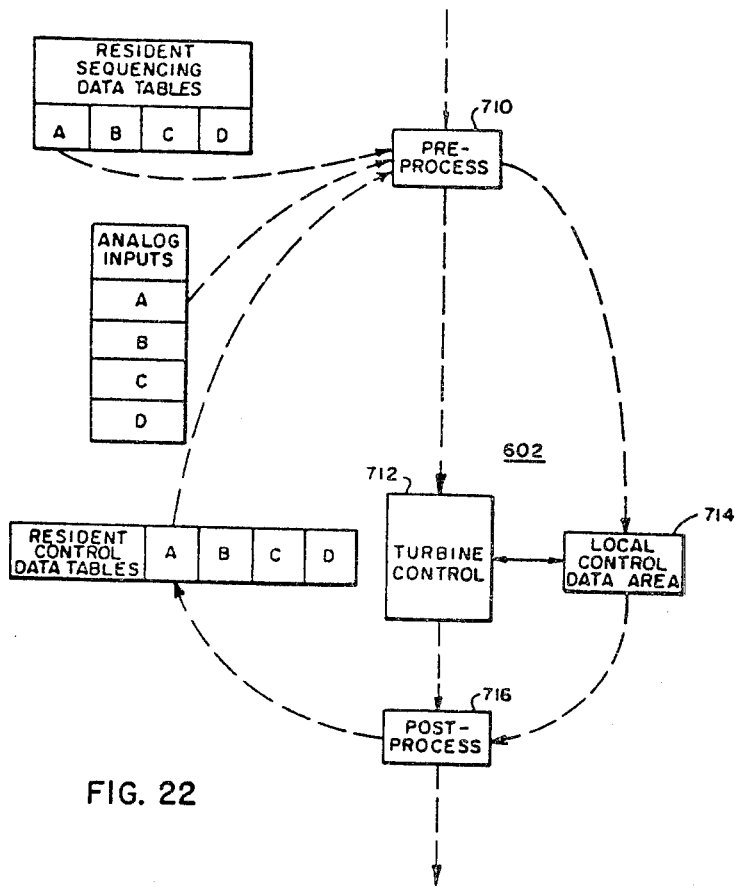
FIG. 22 shows a data flow diagram associated with control program operations during controlled operation of multiple gas turbine power plants with a single control computer.

As indicated in FIG. 22, an operator's console program is provided with interfaces with both the sequencing program 600 and the analog output program 612. Generally, a depressed local operator's pushbutton causes the interrupt routine to bid a dominant level operator's console program, which when active determines the requested action. In the event that generator breaker closing, line breaker closing or emergency shutdown have been requested, priority execution of associated programs results. Other indicated actions occasion the requesting of an associatd secondary sublevel program, which is then placed into the bidding state. Operator/Executive System communication is provided during all modes of gas turbine control.

5. Analog Scan Program

Generally, the analog scan program provides an executive function in reading all analog points associated with the power plant 100 and any similar plant units. The frequency at which the analog points are read is determined by the needs of the process operation, and in this instance, it is set at 30 points per second. The analog scan program can be executed under hardware or software interrupt lockout.

6. Analog Output Program

As previously considered, the general approach employed for generating analog outputs is to employ external holding type operational amplifiers with the amplifier output measured by the computer through the analog input system 308. The measured value is compared with the desired value and the difference is employed in determining how long raise or lower contact closure outputs must be closed to make the holding amplifier integrate to the desired value. The raise or lower value is computed in tenths of a second, and it is determined by an element of the analog output program 612, which is run on a secondary level while the actual contact closure output pulsing is performed by a pulser element of the analog output program 612, run on a dominant level every tenth of a second. The secondary level analog output program element is run every second for speed reference and load limit and every five seconds for the remaining outputs.

The foregoing brief discussions of system components 2 through 6 are herein included to provide in summary form a general description of the control environment which is more fully described in copending application Ser. No. 082,470 Sections D2 through D6, pages 101 through 115.

7. Sequencing Program a. Functional Philosophy

Figure 18:
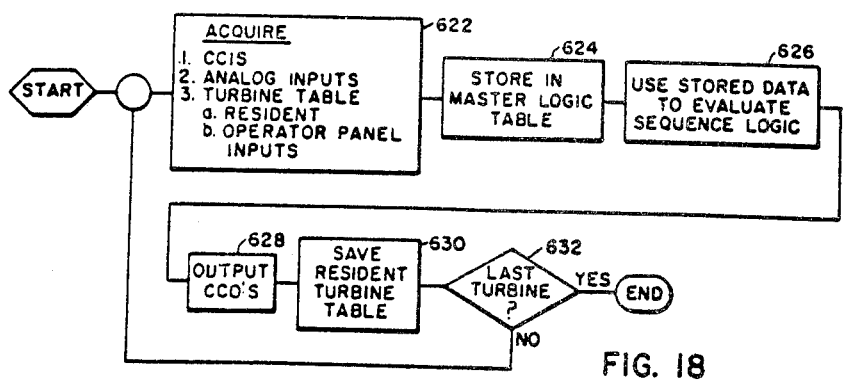
FIG. 18 illustrates a flowchart for a sequencing program associated principally with startup operations for the gas turbine.

Generally, the sequencing program 600 is represented by a flowchart shown in FIG. 18 and it is run once every second to provide the plant sequencing operations required during turbine startup, to provide certain alarm detections and to provide sequencing for various plant tasks during time periods other than the turbine startup time period. As indicated by block 622, certain information regarding the status of the turbine plane 100 and other controlled plants is required for sequencing program execution. The required plant status information which is acquired includes continuous analog data and contact input closures generated by operator panel switches pressure switches, and other plant devices. The acquired information is stored in a master logic table as indicated by the block 624. Next, in providing ultimately for better plant startup management and better plant management generally, the stored data is employed in the evaluation of a plurality of blocks of sequence logic as indicated by block 626.

The results of the evaluation of the sequence logic may require communication with other programs in the program system in which event the results are stored for use by those programs. As indicated by block 628, the results of the evaluation of the sequence logic may also require certain contact closure outputs. In block 630, a resident table of turbine data acquired from core memory by the acquisition block 622 is saved in the original core memory location while nonresident turbine data comprising operator panel inputs is allowed to be destroyed.

Block 632 then determines whether any additional turbines need to be processed in the current run of the sequencing program 600. If not, the sequencing program 600 is ended. If one or more gas turbines remain for sequencing logic determinations in the current run of the sequencing program 600, the program 600 is re-executed for the next turbine and the process is repeated until the last turbine has been serviced with sequence logic processing in the current sequencing program execution.

Figure 19:
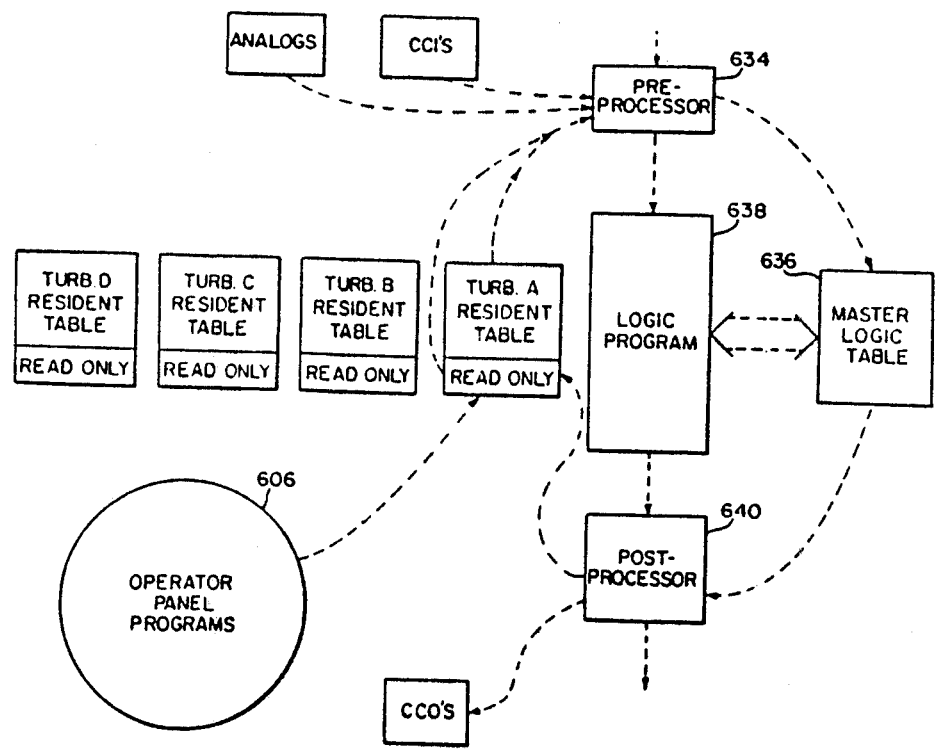
FIG. 19 shows a data flow diagram which illustrates the manner in which the sequencing program is executed to provide multiple power plant operations with a single control computer.

In FIG. 19, there is illustrated a data flow map for the sequencing program 600. As shown, there are four turbine data tables for the respectively designated gas turbines A, B, C and D. Each gas turbine data table comprises a resident portion and a read only portion which is derived from the operator panel program 606. A preprocessor block 634 corresponds to the block 622 shown in FIG. 18, and it obtains data from analog inputs, contact closure inputs, the resident turbine A table and the read only turbine A table. The acquired data is stored in a master logic table as indicated by block 636 which corresponds to block 624 in FIG. 18. The master logic table is employed in the execution of logic program block 638 which corresponds to block 626 in FIG. 18.

After the sequence logic has been evaluated by the program 638 a postprocessor 640 is entered and it corresponds to blocks 628, 630 and 632 in FIG. 18. Thus, contact closure outputs are generated and the turbine A resident table is saved. The postprocessor 640 then provides for a repeat program execution for turbine B table data if a second gas turbine plant is under control. Similarly, repeat executions are made to provide for entry and restorage of turbine C table data and turbine D table data if C and D gas turbine plants are under control. After the last turbine sequence program execution has been employed, an exit is made from the postprocessor block 640.

b. Sequencing Program Table Data Tables and Preprocess and Postprocess Routine Information on core organization of the turbine read/write and read only tables, contact closure input and output data tables, the master logic table and turbine alarm data tables may be found in Section D7b., pages 117 to 150 of the aforementioned copending application Ser. No. 082,469. Additional information on the contact closure input routines, analog input routines, contact input and contact closure output routines employed in blocks 622 and 628 is included therein.

c. Plant Sequence Functions

Generally, the sequence control subsystem embraces certain logic operations which provide for an orderly advance of the process through startup, run and shutdown operations while providing many operating advantages. In providing sequence operations, the sequence control subsystem includes the sequencing program which interacts with the control program and with plant devices to provide direction to process events and simultaneously to provide plant and turbine protection.

In the startup process, a programmed computer master contactor function and operation selectors are employed to force the sequence of starting and operation to assure that turbine startup will normally take place over a fixed predetermined time interval. The software master contactor serves to establish and disestablish logic conditions necessary for initiating the making and breaking of external control circuits for equipment startup and shutdown operations under predetermined plant and equipment conditions.

After ignition programmed sequencing logic causes the control system 300 to be placed in Mode 1 operation and the gas turbine speed reference is increased in a program controlled nonlinear manner to determine the fuel valve positioning.

When the turbine 104 has been advanced to idle (or top or synchronous) speed, it is ready to be synchronized and the control system 300 is transferred to Mode 2 operation in which either manual or automatic synchronizing is performed following field breaker closure. When the turbine-generator unit is synchronized and the generator breaker is closed, the control system 300 is transferred to Mode 3 or Mode 4 operation and the speed reference is set at a value of 106% rated speed. Load is ramped to a predetermined level at a predetermined rate under programmed computer operation.

Shutdown of the gas turbine is caused if any of three time checks fail during the startup sequence. The first time check measures time from initiation of the master contactor function to ignition speed. In addition, a check is made on the time from detection of flame in combustor baskets to 60% speed. Further, a check is made on the time from starting engine trip at 60% rated speed to idle speed.

d. Sequence Logic Charts

Figure 20A:
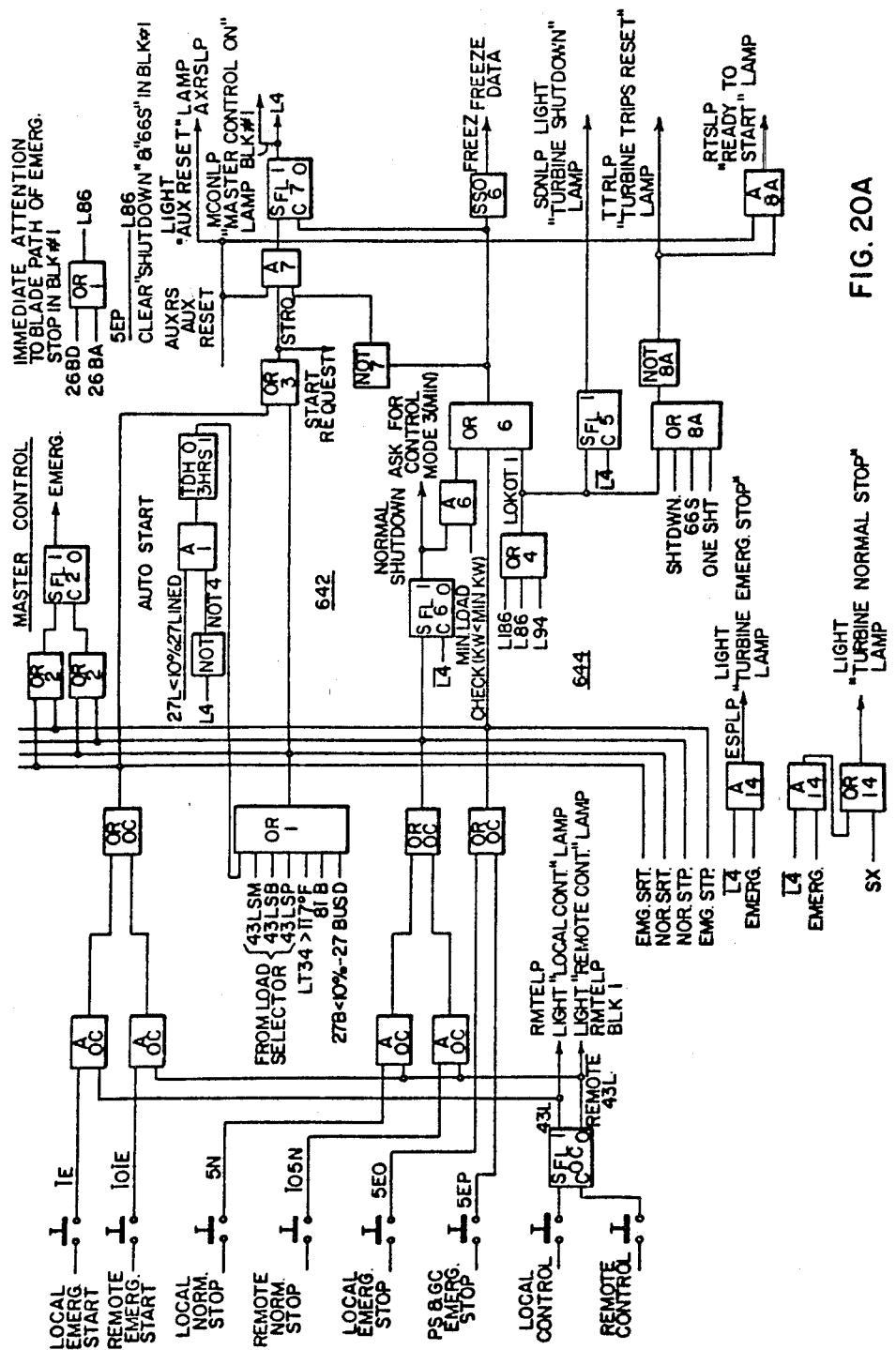
FIGS. 20A-B shows a logic diagram representative of the sequencing logic performed by the sequencing program.
Figure 20B:
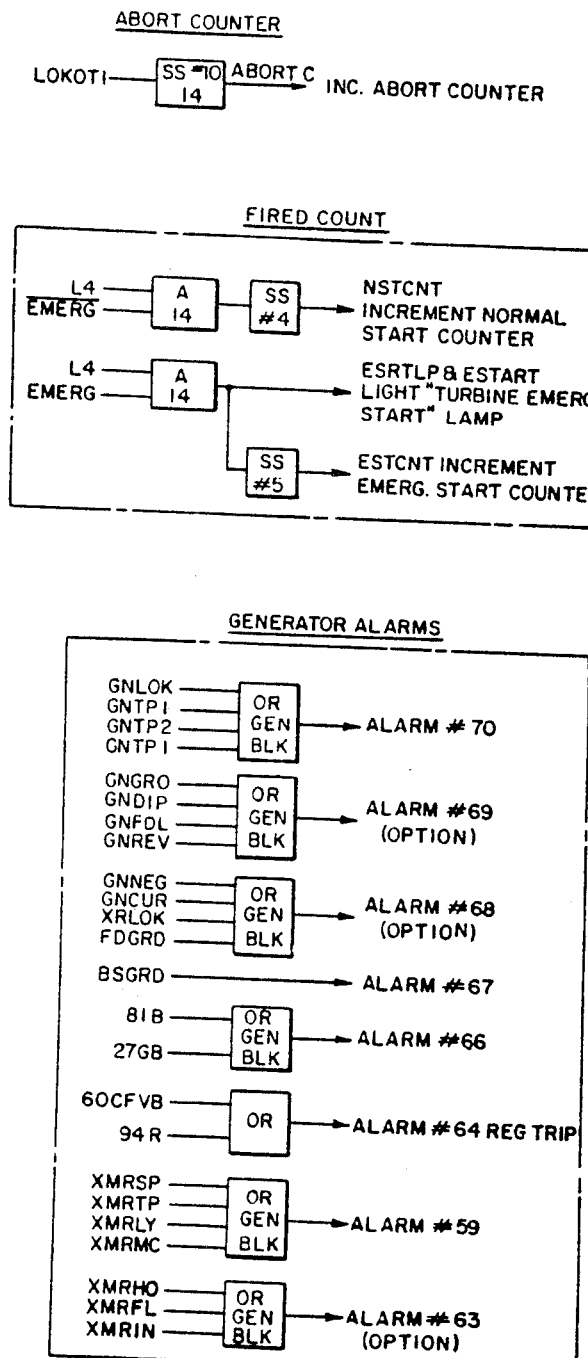

In FIGS. 20A and B, there are shown logic diagrams of representative alarm and sequencing functions performed by the sequencing program 600 in the block 626 (FIG. 18) each time it is executed. Predetermined logic building blocks are employed in defining the conditions for the performance of the sequencing program functions. Each block contains a symbol identifying its function and a number of alpha-numeric character providing a program block identification. The logic function identifying symbol is generally located above the program block identification character. The following is a list of the logic symbols and the logic functions to which they correspond:

A: And
OR: OR
FL: FLIP FLOP
SS: SINGLE SHOT
DB: DEAD BAND
NOT: INVERSION
TDH: TIME DELAY—HOURS
TDS: TIME DELAY—SECONDS.

There is principally shown the logic associated with start/stop operations and the master contactor or control function to which reference has already been made. Generally, logic diagram 642 pertains to the master contactor or control function generated by flip-flop FL7 as a function of pushbutton operations and other conditions. Similarly, logic diagram 644 relates to the generation of a shutdown operation in response to pushbutton, shutdown alarm and other conditions. Thus, shutdown OR block OR6 resets the master contact function flip-flop FL7 when a shutdown is initiated. In the logic diagram 644, alarm shutdowns are initiated by line L86 through block OR4. On shutdown, single shot block 6 provides for registering predetermined data.

Other sequencing program logic functions set forth in logic diagram form in FIGS. 20A and B include a plurality of generator alarms designed as OR GEN BLK blocks. In addition, block OR1 provides for immediate shutdown on blade path over-temperature through block OR4. Single shot blocks 4, 5 and 14 respectively provide normal start counts, emergency start counts, and abort counts. A list of miscellaneous alarms is also included.

Further description of the plant sequence functions, associated sequence logic charts, macro instructions for sequencing logic and logic subroutines and macros related thereto may be found in the aforementioned copending application Ser. No. 082,467, Section D.7c. through D.7e. found at pages 151 to 164 thereof.

8. Control Program

The following brief discussion of a control program suitable for use in the preferred embodiment of the present invention may be considerably amplified by a reference to the corresponding section of one of the aforementioned copending applications, e.g., Ser. No. 082,470.

Figure 21:
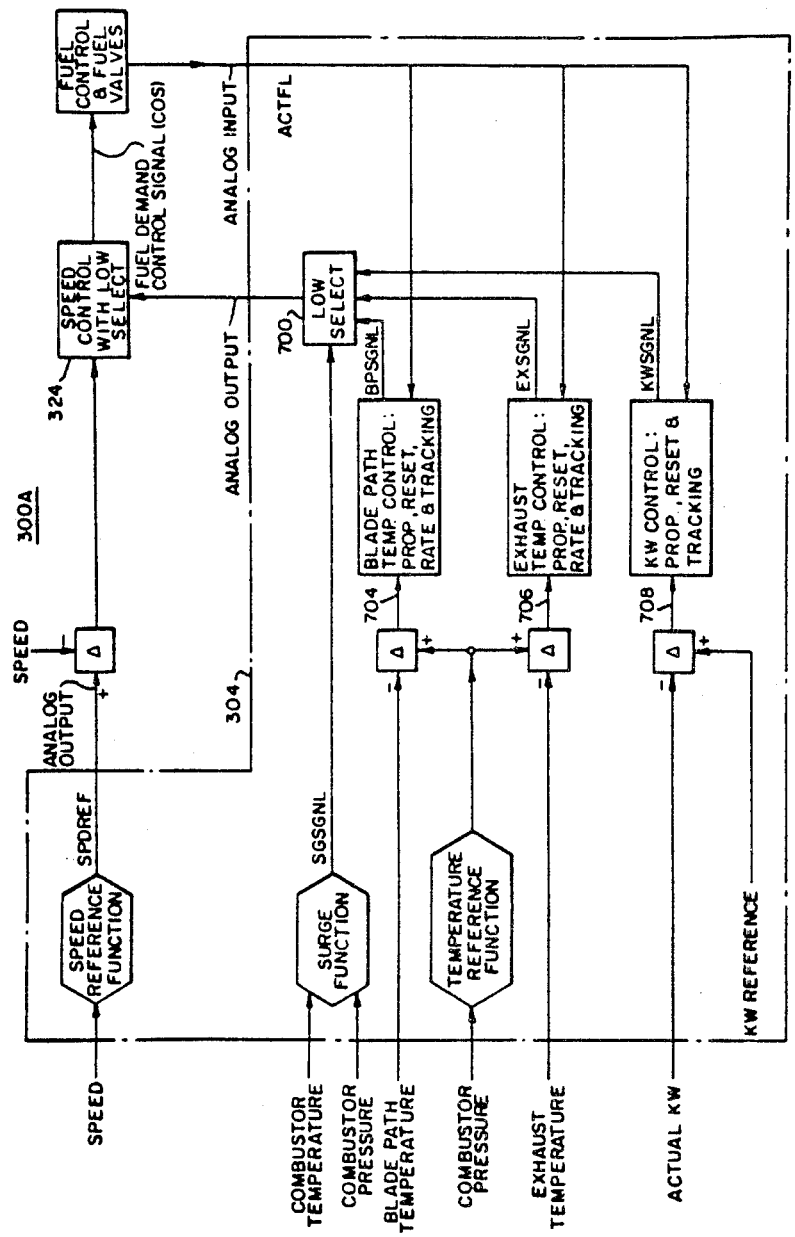
FIG. 21 shows a block diagram of a control loop arrangement implemented in the preferred embodiment.
Figure 30:
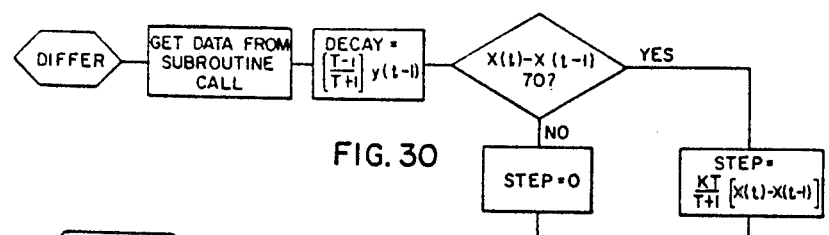
FIG. 30 shows a flowchart for a rate function employed in temperature limit operations.

As indicated in FIG. 17 the control program 602 interacts with the sequencing program 600 providing control loop determination of the operation of the gas turbine plant 100 and like plants if provided. A preferred control arrangement is considered in FIG. 21. Upon determination by the sequencing program 600 of the control mode in which the control program 602 is to be operated and the accomplishment of the sequencing steps previously discussed, control program 602 becomes active, operating in the control loop arrangement 300A. The hybrid interface depicted provides for software speed reference generation and selection of a single low fuel demand limit in software low select block 700 for application to analog hardware speed control 324.

The output fuel demand signal is selected as the lowest of a speed error fuel demand signal and the computer output fuel demand limit signal as previously considered. The actual fuel demand control signal ACTFL is read as an analog input for tracking in various software control paths as considered more fully subsequently. Surge limit, blade path and exhaust temperature limit and load limit control loops are all provided with software control functions which respond to external data and generate outputs to the software low select block 700 as indicated by the respective reference characters 702, 704, 706 and 708.

Referring now to FIG. 22, execution of control program 602 proceeds as follows:

(a) Preprocessing by block 710 of the resident control data table containing various parameters indicating current turbine status and a pointer to the sequencing table which contains a control mode indicator and the selected load and start-up status.

(b) Analog control program data acquisition including blade path, exhaust and compressor inlet temperatures, combustor shell pressure, actual fuel demand signal and actual kilowatt output.

(c) Reliability testing of acquired analog temperature readings to prevent overheating of critical turbine parts.

(d) Execution of turbine control block 712, to be hereinafter outlined.

(e) Block 716 postprocessing including table updates as indicated by the circular data flow.

The foregoing steps are repeated cyclically for turbines B, C and D if provided.

Figure 23:
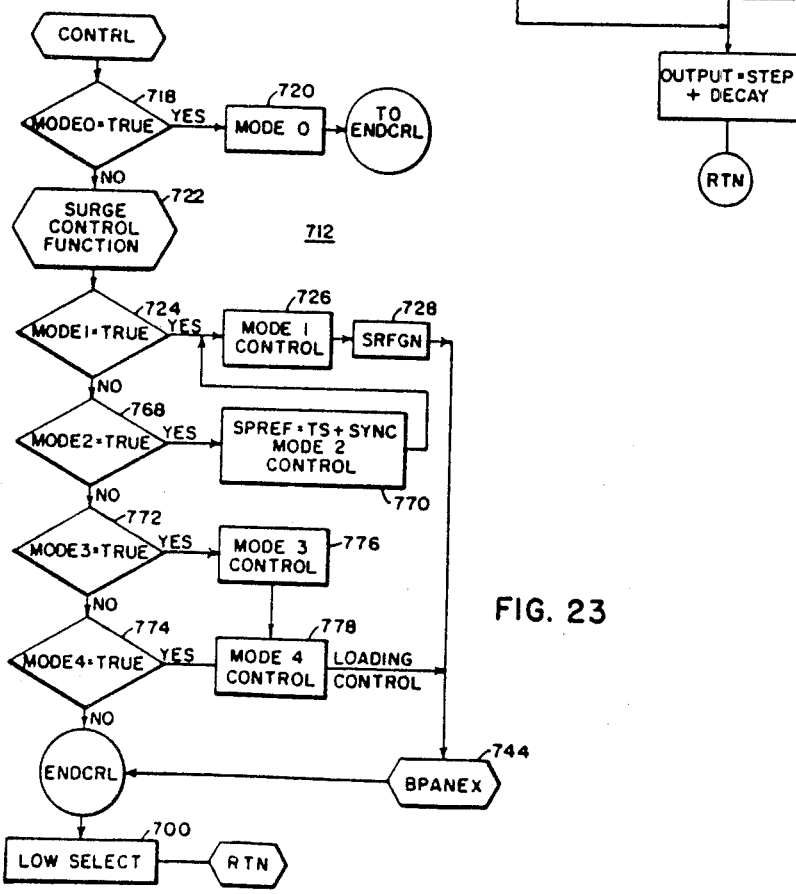
FIG. 23 illustrates a flowchart which represents control program operations in the preferred embodiment.

Turbine control block 712 is shown in greater detail in FIG. 23. As shown, control actions are directed consistent with turbine control mode directives. If block 718 determines that the turbine is in Mode 0 status, initialization is accomplished by the execution of block 720. Actual turbine speed tracking is provided so that a smooth transition is made in the computer generated speed reference during transfer from Mode 0 to Mode 1.

Figure 31A:
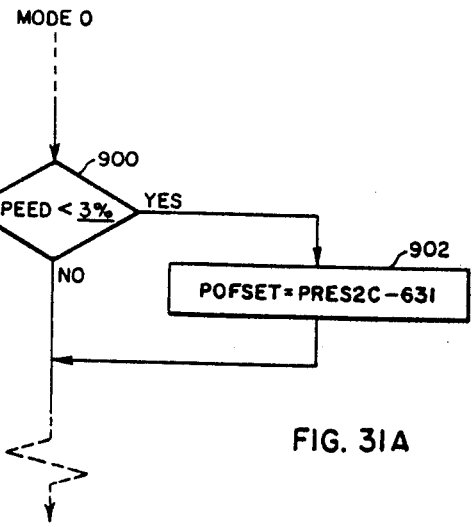
FIGS. 31A-B show flow diagrams for the program steps employed in accomplishing the dynamic calibration and error correction of the present invention in operating Modes 0 and 1, respectively.

Referring to FIG. 31A a flowchart is shown for those steps of the control program implemented in accordance with the principles of the present invention which are executed in Mode 0. Block 900 determines whether the turbine has reached a speed corresponding to that desirably attained at light-off. As shown an offset value is computed as the difference between a scaled analog input value PRES2C (one half the combustor shell pressure) and a constant 631₈ which is the actual equivalent of one half the number corresponding to one volt, the voltage level representing a pressure transducer reading of 0 psig. (Various scaling techniques are used throughout the control program system. In this instance results are carried at half value). Execution of block 902 occurs once each second until light-off. Thus, upon the occurrence of such event location OFFSET contains a scaled number representative of an error attributable to instrumentation drift at shutdown, i.e., drift compensation is dynamic through initial program execution and becomes fixed at the shutdown value at light-off. In this manner improper transducer rezeroing is eliminated.

If the control is not in Mode 0, block 722 next determines the surge control function for use in the surge control loop (FIG. 21) in all other modes of operation. To prevent compressor surge under excessive pumping demands, the surge control function determines a maximum fuel demand limit as a function of the compressor inlet temperature and the combustor shell pressure. A discussion of the surge limit function determination may be found in copending application Ser. No. 082,470 beginning at page 186 thereof. Analog inputs representative of temperature are reliability checked as described in copending related application Ser. No. 155,905. Combustor shell pressure readings are extremely accurate, having been obtained as a result of the dynamic calibration and error correcting system and method of the present invention.

In Mode 1 control block 726 is executed to provide acceleration control from ignition speed of approximately 1000 RPM to the top speed of 4894 RPM. Fuel demand signal tracking is provided and a nonlinear temperature reference is generated in a manner similar to that employed in surge limit functional determination, again, as discussed in the aforementioned copending application, Ser. No. 082,470. Temperature references as a function of combustor shell pressure are determined for both normal and emergency startups.

Repeated executions of the control routine 712 are made during the time period that the gas turbine 104 is placed under sequencing and acceleration operations in Mode 1 control. A speed reference for analog output to the speed control 324 is provided in block 728. Such reference is derived from previously input nonlinear curve representative of optimum fixed time acceleration for both normal and emergency startup as previously indicated. A linear interpolation routine similar to that described in connection with the surge limit functional determination is employed to derive acceleration values at working time points between the time points corresponding to the stored curve points. The speed reference algorithm may be found at page 50 of copending application Ser. No. 082,470.

Figures 24, 25:
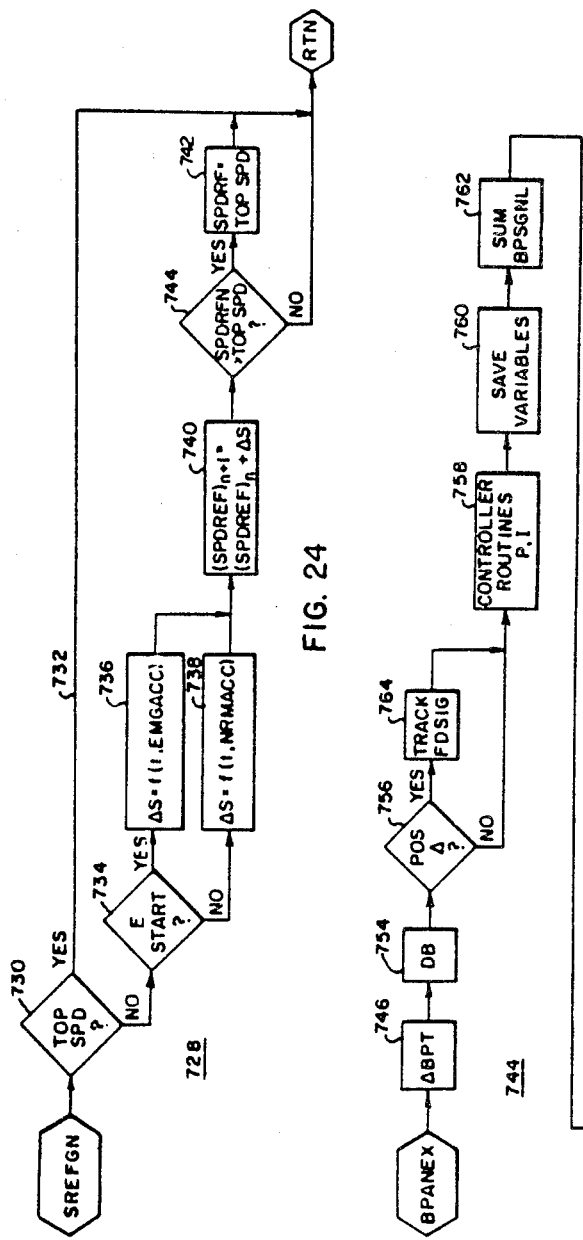
FIG. 24 shows a more detailed flowchart for a speed reference generation function included in the program of FIG. 23.
FIG. 25 shows a more detailed flowchart for a gas turbine blade path and exhaust temperature limit function employed in the program of FIG. 29.

The speed reference generation program is shown in greater detail in FIG. 24. Block 730 first determines if the gas turbine 104 has attained top or substantially synchronous speed. If this condition is satisfied, the speed reference routine is bypassed and a return is made to the turbine control program execution. If not, block 734 determines whether an emergency start has been requested. Block 736 and 738 correspond respectively to emergency and normal startups, and as shown a change in the speed reference required for the next sampling time interval is calculated. In block 740 the speed reference step change is added to the preceding speed reference.

A top speed limit is next placed on the speed reference by block 742 if block 744 detects an excessive speed reference value. If not, the speed reference value is stored and a return is made to the execution of the control block 712.

Temperature control is provided as shown in FIG. 25. In the temperature limit routine 744 a temperature error is first determined by taking the difference between the temperature reference previously derived and the actual and preprocessed average blade path temperature. The output of block 746 is compared with a predetermined deadband in block 754. If an error exists outside the deadband, the sign is determined in block 756. If the blade path temperature error is negative, control action is imposed by block 758 with a proportional routine and an integral routine. Blade path temperature and temperature error variables are stored by block 760 and block 762 sums the results of the proportional and integral operations of block 758 to generate the blade path output limit representation BPSGNL.

If the blade path temperature error is positive, fuel demand signal tracking block 764 is executed so that faster control action may follow a change in temperature error from positive to negative, since through this device the reset routines do not have to integrate back from some saturated output value. In particular, the tracking action is such that the reset block output never exceeds the fuel demand signal by more than a difference value.

To obtain the tracking action, the desired difference value is added to the low selected fuel demand signal and the result is differenced from the output of a reset of integrator routine and applied to the input of the reset routine. The output of the integration operation accordingly tracks the fuel demand signal with a positive bias. Such tracking operation allows the tracking control loop to enter quickly into fuel control if required by a change in the error quantity controlled by the tracking control loop. The integration routine may be found at page 202 of copending application Ser. No. 082,467.

After execution of the block 762, the exhaust temperature control or tracking action is determined in a series of blocks similar to those just considered in connection with blade path temperature control and tracking action. Further, a save variable block 769 provides for storing the exhaust temperature error and the track function output initiated by block 769. After the exhaust temperature output limit is determined in block 766 a return is made to the routine 713 in FIG. 23. Next, a software low selection is made by block 700 in Mode 1 control program execution.

Figure 31B:
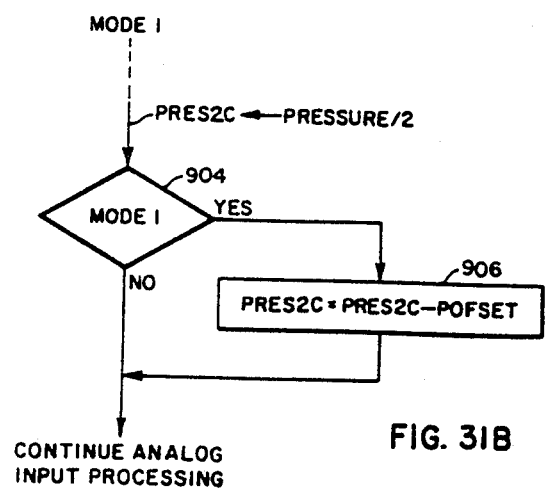

Throughout Mode 1 drift offset error corrections are made in deriving a combustor shell pressure value for use in surge limiting. Referring to FIG. 31B, the initial pressure value obtained from an analog input table is divided by 2, consistent with internal program scaling previously discussed, and stored in PRES2C. If Mode 1 program switch is set on (block 904), the value in PRES2C is replaced by the value PRES2C−OFFSET as indicated at 906. Thus the dynamic calibration and error correction steps of the present invention are accomplished.

Summarizing and expressing the foregoing in equation form:

Consistent with the assumption that the pressure transducer is calibrated over its full range and that the error is in the form of a constant offset then any transducer reading is given as:

$$P2C_{transducer} = P2C_{actual} + P2C_{error} \quad (1)$$

When the unit is on turning gear $P2C_{actual}$ should equal zero. Thus (1) becomes $$P2C_{transducer} = P2C_{error} \quad (2)$$

Therefore, a reading taken at shutdown is a direct measure of the error. After start a corrected pressure reading may be obtained by subtracting $P2C_{error}$ from $P2C_{transducer}$. Thus, $$P2C_{corrected} = P2C_{transducer} - P2C_{error} \quad (3)$$
$$= P2C_{actual} + P_{error} - P_{error}$$
$$= P_{actual}$$

To briefly examine an example of the operation of the principles of the present invention, consider the case where the pressure transducer had returned to a 1 lb. setting instead of to 0. This would be read and noted by the computer and saved in memory. If the transducer slowly drifted back toward 0 during the shutdown period, the successive changes would also be noted. Assume that upon restarting P2C reads 0.6 pounds. Then the reading saved would be 0.6 lbs. Thus at startup $P_{corrected} = 0.6_{psig} - 0.6_{psig} = 0$. All future readings would then be offset by a similar amount.

Once synchronous speed is reached, block 768 in FIG. 23 directs the program into Mode 2 control operations. In block 770, the speed reference is set equal to the top speed value plus any speed change entered into the control loop by manual synchronization operations or by automatic synchronization program execution. Further, the program operations are redirected through blocks 726, 728, 744 and 700 as in the case of Mode 1 control.

Figure 26A:
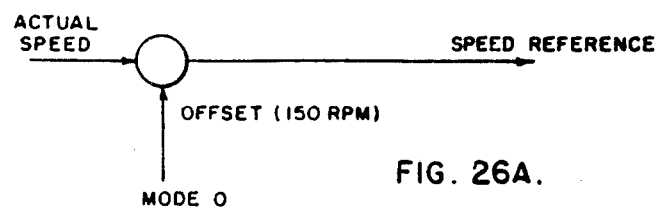
FIGS. 26A-D show respective control configurations of software elements associated respectively with Mode 0 through Mode 4 operations.
Figure 26B:
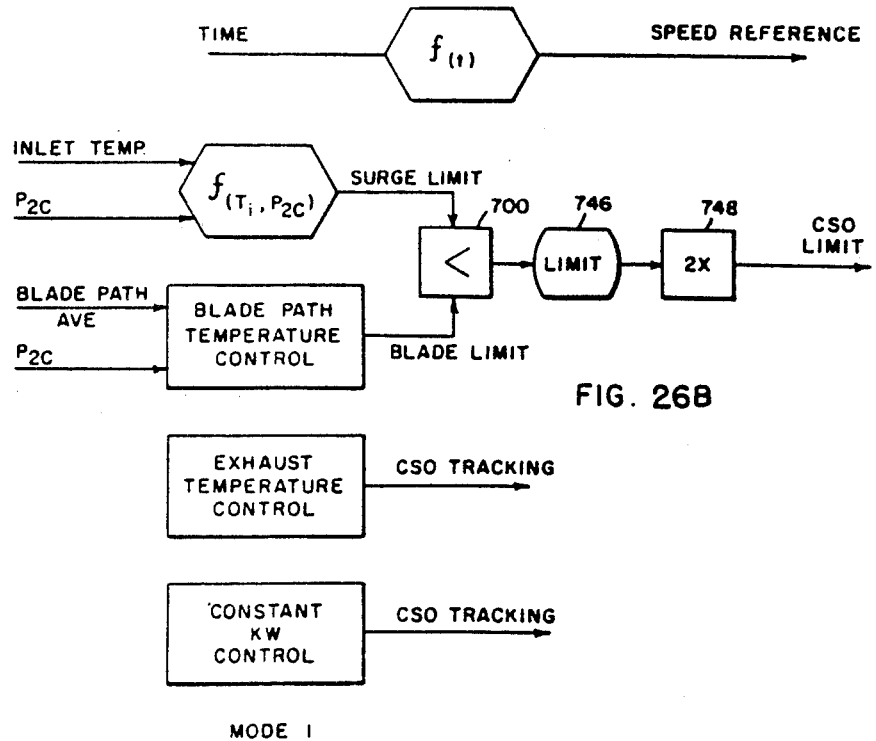
Figure 26C:
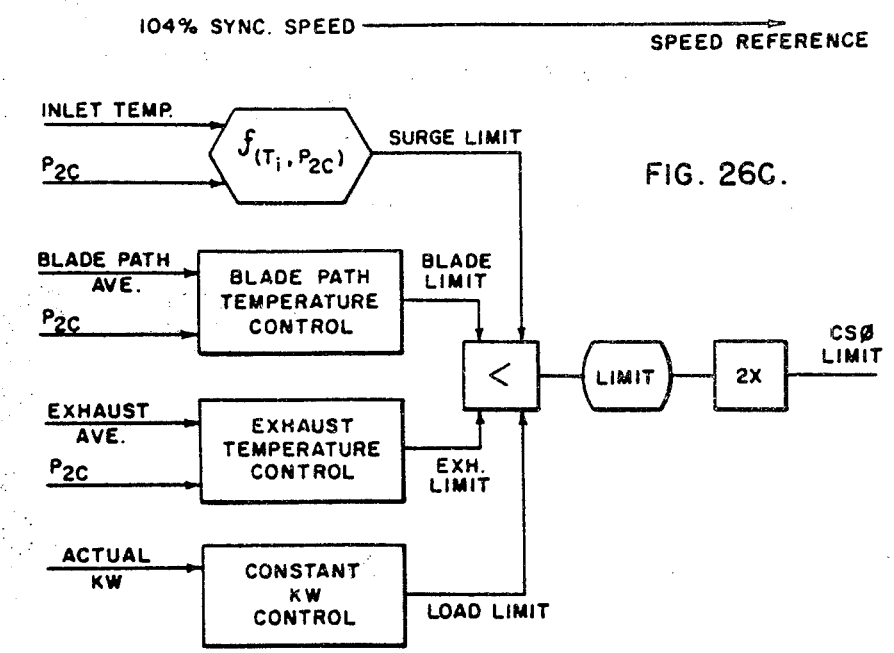

After synchronization block 772 or 744 directs control program operations to a Mode 3 control block 766 or a Mode 4 control block 778 according to the operator's panel selection. Mode 3 control, depicted in FIG. 26C provides for determining kilowatt error from the difference between a kilowatt reference and actual kilowatts. Proportional and integral control routines are then applied to the kilowatt error and the resultant controller outputs are summed in order to provide for constant kilowatt control with temperature limit backup. Further, a loading rate limit is imposed to prevent excessive thermal transients due to excessive loading rates under automatic or manual incremental loading. A discussion of the loading limit subroutine and its operation in Modes 1, 2 and 3 may be found at page 194 of copending application Ser. No. 082,470.

Initially, in Mode 3 operation, the kilowatt reference is set at a minimum value pending operator selection of a reference value which may not exceed a value corresponding to the base load exhaust temperature limit. Thus, the primary Mode 3 controls are the exhaust temperature control and the constant kilowatt control, with blade path and surge controls providing backup protection.

Figure 26D:
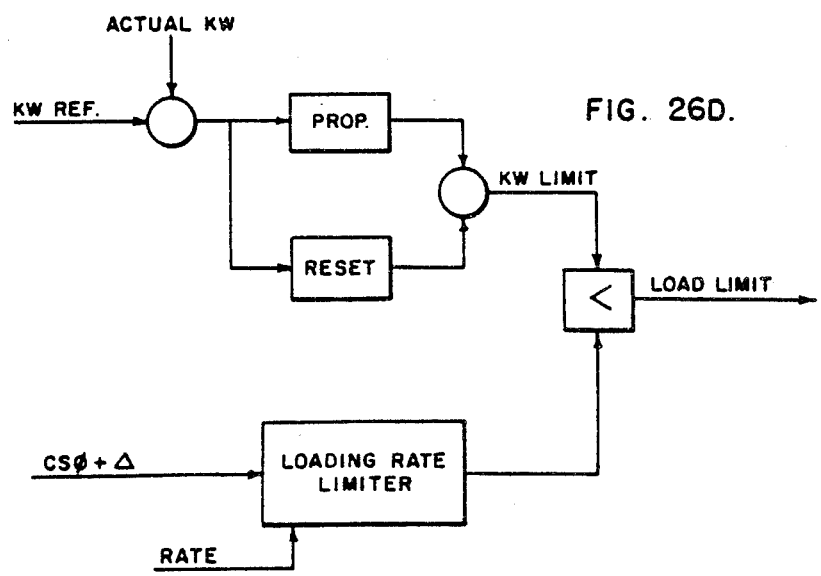
Figure 27A:
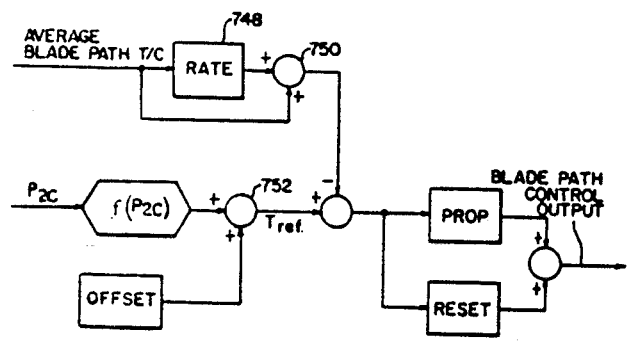
FIGS. 27A-B respectively show software control configurations for the blade path temperature and exhaust temperature limit functions.
Figure 27B:
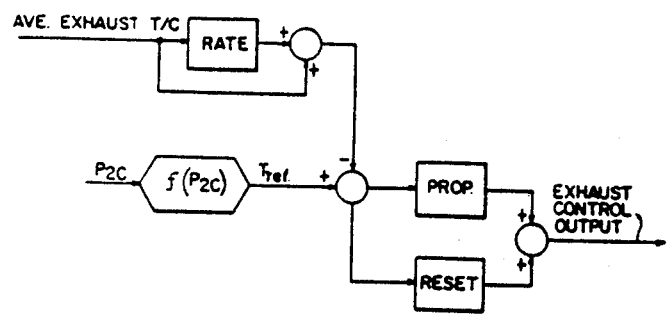
Figure 28:
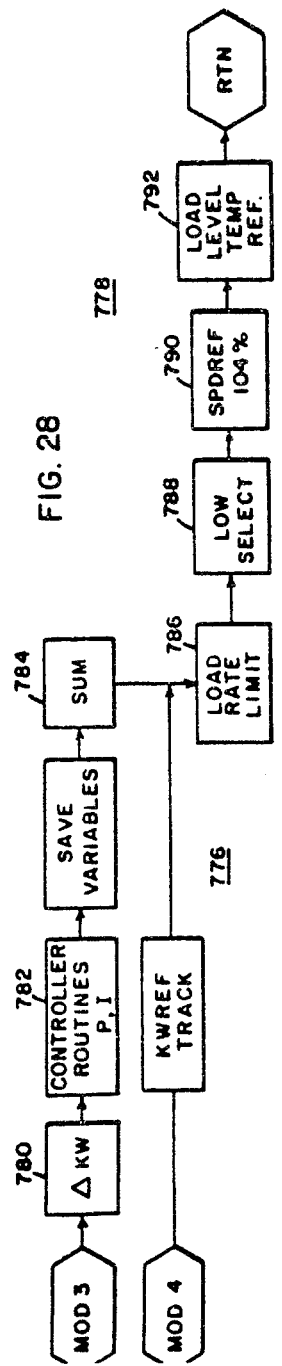
FIG. 28 shows a flow diagram for control program operations which provide load control and load limit functions for the gas turbine power plant.
Figure 29:
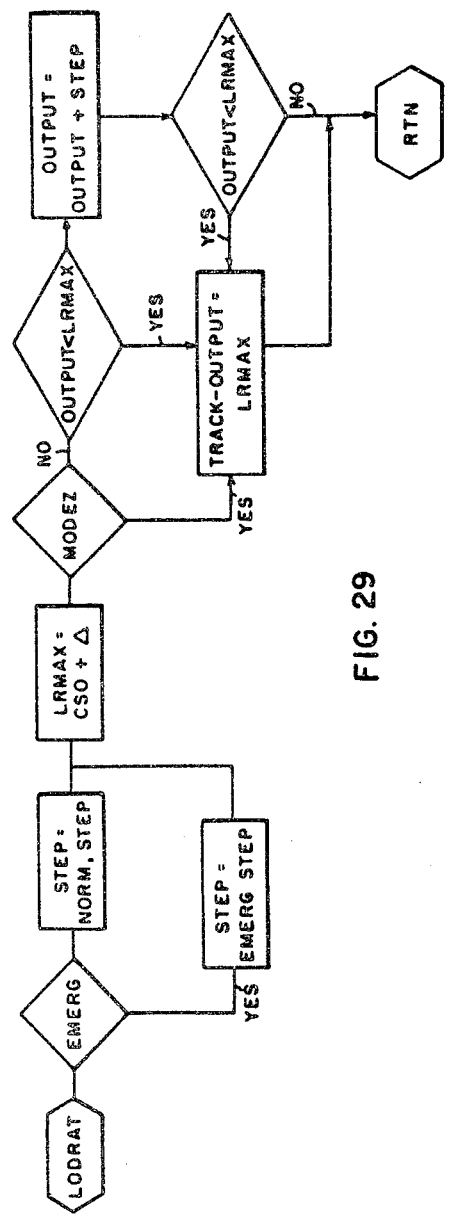
FIG. 29 illustrates a flowchart for a load rate limit function employed in the load control and limit operations illustrated in FIG. 28.

Mode 4 control (FIG. 26D) differs from Mode 3 control in that no constant kilowatt function is provided for Mode 4. However, a loading rate limit is imposed. A temperature reference is determined for use in the blade path and exhaust temperature limit control block 744.

In both Mode 3 and Mode 4, the block 744 is executed in a manner considered previously in connection with Mode 1. Since no constant kilowatt function is provided for Mode 4, the block 744 provides for a temperature loading operation through exhaust temperature limit action. Under temperature control, the generated power varies with the ambient error temperature such that more power is generated with lower inlet air temperature.

Load Mode 3 and load Mode 4 program executions are completed through low select block 700 which selects the lowest fuel demand representation associated with the temperature, surge and load limits to provide the control operation as described. Control program execution through the block 766 and/or 788, 744 and 700 continues for the duration of Mode 3 or Mode 4 load control.

A variety of special control program macros and subroutines are employed in the preferred implementation of the control program 602. A discussion of such may be found in Section D8 of the aforementioned copending application Ser. No. 082,467, pages 198 to 203.

9. Alarm and Thermocouple Check Programs

In the alarm system, alarms are generated in response to sensors considered in connection with FIG. 9. Printout of alarms is made as in the following example:

| Time | Status | Turbine Identification | Description |
| --- | --- | --- | --- |
| 12:30 | ALRM | A | Flame A |

The status conditions of the alarms are listed below:
NORM—Normal
ALRM—Alarm

Alarms are determined by the sequencing program 600 and the thermocouple check program 616 as previously considered. The alarm program 610 is periodically executed to print out all points in alarm. Multiple confusing alarm lightings as encountered with conventional annunciator panels are thus avoided.

The thermocouple check program 616 also runs on a periodic basis. When it is executed, a check is made of the values stored for all thermocouples not checked by the control program 602 to determine if the thermocouple value is more negative than a predetermined check number stored in location CHKNO. An excessive negative number is considered an open circuit and an alarm bit is set for the alarm program 610.

10. Data Logging Program

A formated log is printed in response to execution of the log program 618 on a periodic basis selected by the plant operator within the range of 15 minutes to two hours. The printed readings are instantaneous values obtained from the last analog scan cycle. The plant operation may select any 20 analog points per turbine under control.

Generally, the analog conversion program 602 provides for converting entered analog values into the engineering value represented by the input and vice versa. Generally, four types of conversion are provided, i.e., flow straight-line, thermocouple, and segmented straight-line.

11. Miscellaneous Programs

The miscellaneous programs 622 include a programmer's console function program, a dead switch computer program, a power failure and restart program, and a horn and alarm lamp program. Additional programmer's console functions designated herein as being implemented by miscellaneous programs rather than the executive program include a CCI print status program, an analog engineering units print program, a contact output operate program, a test dead computer system program and a time program.

The alarm and thermocouple check programs, data logging program, and miscellaneous programs are more fully discussed in the aforementioned copending application Ser. No. 082,470, Section D9 to Section D11, pages 204 to 210.

We claim:

1. A control for a gas turbine electric power plant having a gas turbine with compressor, combustion and turbine elements, a generator drivably coupled to said turbine for generating electric power, said control comprising fuel supply means for supplying fuel to said gas turbine combustion element, control means for controlling the operation of said plant, means responsively coupled to said control means for operating said fuel supply means to supply fuel to said combustion elements in controlled quantities, and pressure detection means positioned in said plant to sense combustion shell pressure in said combustion element and coupled to apply a signal representative of combustion shell pressure to said control means means for storing a calibration value for said pressure signal based on the relative values of the actual pressure signal and an expected pressure signal value during the last turbine shutdown, said calibration value being utilized by said control means to compensate the actual pressure signal provided by said detection means during turbine operation.

2. A gas turbine control as set forth in claim 1 wherein said storing means stores a calibration value for said pressure detection means equal to the difference between the actual and expected signal values substantially at the time of lightoff during turbine startup.

3. A gas turbine control as set forth in claim 1 wherein said control means includes digital computer means which in turn includes said storing means and includes additional means for predetermined monitoring and control functions for said control means.

* * * * *